United States Patent
Chrabieh

(10) Patent No.: US 9,961,559 B2
(45) Date of Patent: May 1, 2018

(54) ACCURATE SHORT RANGE POSITIONING WITH WIRELESS SIGNALS

(71) Applicant: Nestwave SAS, Paris (FR)

(72) Inventor: Rabih Chrabieh, Paris (FR)

(73) Assignee: Nestwave SAS, Paris (FR)

(*) Notice: Subject to any disclaimer, the term of this patent is extended or adjusted under 35 U.S.C. 154(b) by 0 days. days.

(21) Appl. No.: 15/723,076

(22) Filed: Oct. 2, 2017

(65) Prior Publication Data
US 2018/0027421 A1    Jan. 25, 2018

Related U.S. Application Data

(63) Continuation-in-part of application No. 14/968,880, filed on Dec. 14, 2015, now Pat. No. 9,813,877.

(51) Int. Cl.
*H04W 16/20* (2009.01)
*H04W 56/00* (2009.01)
*H04W 64/00* (2009.01)

(52) U.S. Cl.
CPC ......... *H04W 16/20* (2013.01); *H04W 56/001* (2013.01); *H04W 64/00* (2013.01)

(58) Field of Classification Search
CPC ....... H04W 64/00; H04W 4/02; H04W 4/008; H04W 84/12; H04W 4/04; H04W 56/001; H04W 88/08
See application file for complete search history.

(56) References Cited

U.S. PATENT DOCUMENTS

| | | | | |
|---|---|---|---|---|
| 2014/0323152 | A1* | 10/2014 | Zhang | H04W 64/00 455/456.1 |
| 2016/0119095 | A1* | 4/2016 | Lee | H04W 16/00 370/329 |
| 2016/0302165 | A1* | 10/2016 | Da | H04W 56/001 |

* cited by examiner

*Primary Examiner* — Nam Huynh
(74) *Attorney, Agent, or Firm* — Lumen Patent Firm

(57) ABSTRACT

Positioning determination of a communication device in a wireless communication network is supported by a positioning device receiving [230] tight synchronization signals from a master positioning cell; determining [232] therefrom a plurality of time differences between their actual and theoretical times of arrival; synchronizing [234] a positioning cell clock based on the received tight synchronization signals adjusted by the time differences; and emitting [236] to the communication device a positioning signal at a time determined by the synchronization. The positioning signal includes an identifier of the positioning cell, and it is transmitted so as not to interfere with positioning pilot signals transmitted by the wireless communication network. The positioning device may alternatively receive synchronization signals from another positioning cell instead of a master positioning cell.

7 Claims, 12 Drawing Sheets

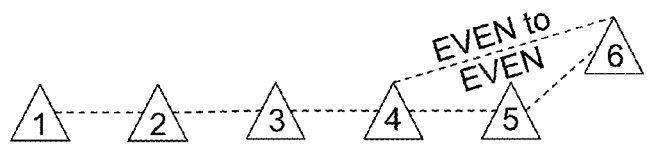
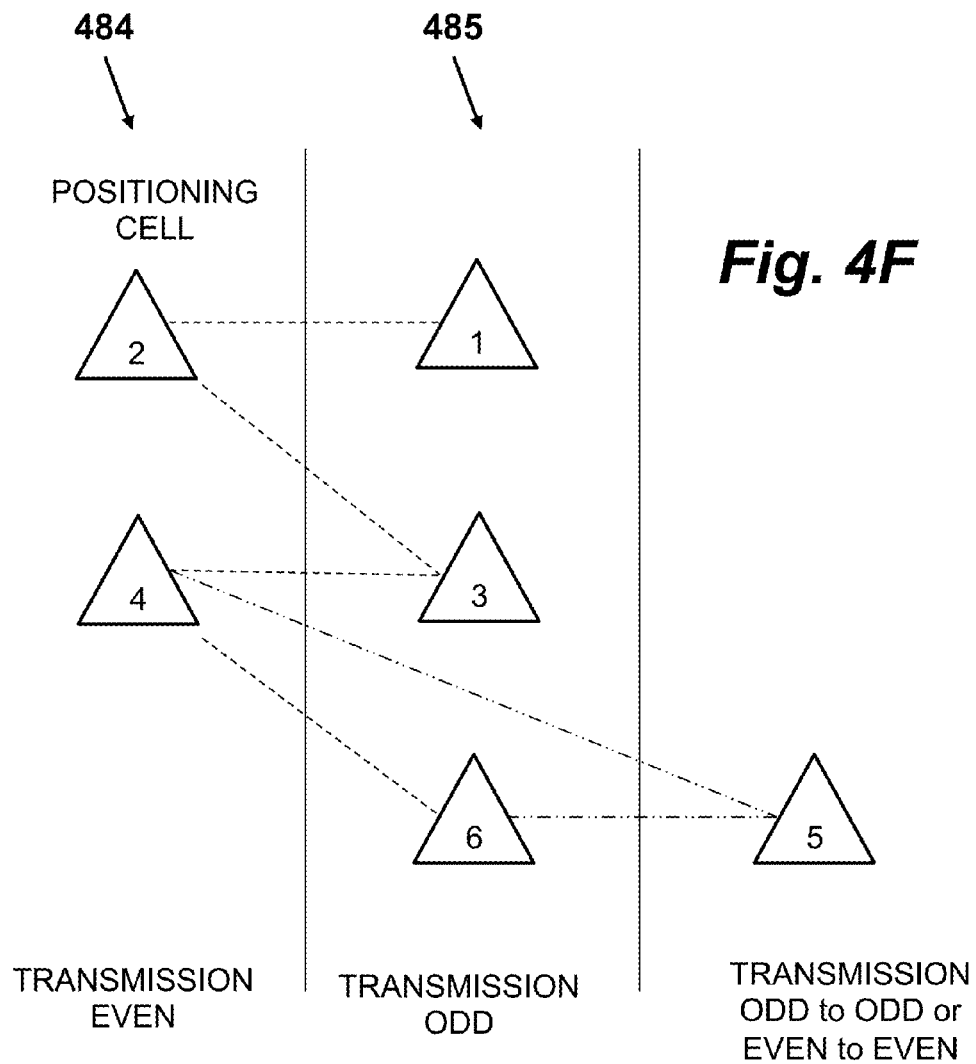

ACCURATE SHORT RANGE POSITIONING WITH WIRELESS SIGNALS

CROSS-REFERENCE TO RELATED APPLICATIONS

This application is a continuation-in-part of U.S. patent application Ser. No. 14/968,880 filed Dec. 14, 2015, which is incorporated herein by reference.

FIELD OF THE INVENTION

The present invention generally relates to techniques for locating wireless communication devices using RF electromagnetic waves. More specifically, it relates to techniques for positioning using positioning signals from multiple positioning cells.

BACKGROUND OF THE INVENTION

Accurately locating a wireless communications device indoors or in a venue (e.g., shop or shopping mall, stadium, parking, building, enterprise, factory), has a number of applications. Most solutions today use Bluetooth, WiFi, UWB (Ultra-WideBand), cameras or motion sensors. But all of these solutions have drawbacks, e.g., typical accuracy is no better than 5 m.

SUMMARY OF THE INVENTION

In one aspect, the invention provides a method implemented by a positioning cell for supporting positioning determination of a communication device in a wireless communication network. The method includes receiving by the positioning cell from a master positioning cell a plurality of tight synchronization signals; determining by the positioning cell a plurality of time differences between times of arrival of the plurality of tight synchronization signals and theoretical times of arrival of the plurality of tight synchronization signals, where the theoretical times of arrival are corrected by theoretical times of flight along a direct line-of-sight path from the master positioning cell to the positioning cell; synchronizing the positioning cell based on one or more of the received tight synchronization signals adjusted by one or more of the plurality of time differences, wherein the synchronizing comprises synchronizing a clock in the positioning cell; and emitting by the positioning cell to the communication device in the wireless network a positioning signal at a time determined by the synchronized clock, where the positioning signal comprises data indicative of an identifier of the positioning cell, and where the positioning signal is transmitted so as not to interfere with positioning pilot signals transmitted by the wireless network.

Preferably, the plurality of tight synchronization signals received from the master positioning cell are synchronized by the master positioning cell to synchronization signals from another master positioning cell, cellular network, WiFi network, or satnav system. Optionally, the data indicative of an identifier of the positioning cell comprises local physical cell identifications (PCIs) and no global cell identifications. Preferably, the emitting of the positioning signal uses multiplexing so that the positioning signal is orthogonal to pilot signals transmitted by the wireless network.

The method may also include receiving by the positioning cell from the master positioning cell data indicative of time differences between a measured time of arrival of the positioning signal at the master positioning cell and a theoretical time of arrival of the positioning signal at the master positioning cell; and determining by the positioning cell from the data indicative of time differences an adjustment in a timing of emission of a subsequent positioning signal from the positioning cell.

In another aspect, the invention provides a method implemented by a positioning cell for supporting positioning determination of a communication device in a wireless communication network. The method includes receiving by the positioning cell from a first positioning cell a synchronization signal, where the synchronization signal is synchronized by the first positioning cell to tight synchronization signals received by the first positioning cell from a master positioning cell that is synchronized to a cellular network, WiFi network, or satnav system; and emitting by the positioning cell to the communication device in the wireless network a positioning signal after a predetermined time period following reception of the received synchronization signals, where the positioning signal comprises data or timing indicative of an identifier of the positioning cell. Preferably, the positioning signal is transmitted so as not to interfere with positioning pilot signals transmitted by the wireless network.

BRIEF DESCRIPTION OF THE DRAWINGS

FIG. 4F is a timing diagram illustrating a method where tight synchronization is performed in a first stage (a little later it is followed by positioning signals), according to some embodiments of the present invention;

FIG. 4G is a diagram illustrating how the cells in FIG. 4F may be geographically connected from the point of view of LoS. In essence, the small picture clarifies the larger picture. It is geographical while the larger picture is time based.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

Embodiments of the invention may be implemented and deployed in conjunction with a variety of different existing wireless communication or positioning systems. Possibilities include cellular networks using licensed spectrum, WiFi or Bluetooth networks using unlicensed spectrum, or satellite navigation systems. Although embodiments of the invention will be described herein using such examples for the purpose of illustration, those skilled in the art will recognize that the invention not restricted to these particular examples. After reading this description, it will be understood by those skilled in the art how the invention can be implemented in different and alternative wireless environments.

The use of cellular technology for positioning may be advantageous as the cellular network is always on, has low power consumption, low interference and can be operator controlled. Observed Time Difference Of Arrival (OTDOA) positioning is one known approach, which provides position accuracy of 20 m-200 m. However, there exists no indoor or venue-based cellular or other positioning solution with reliable accuracy less than 10 m, ubiquitously available indoor and outdoor, and scalable. Current positioning methods such as WiFi or Bluetooth positioning are either inaccurate, or unavailable, or non-scalable. For instance, WiFi positioning typically requires the exchange of messages between each Access Point (AP) and the communication device; a non-scalable method as it creates interference and it is power-consuming. Furthermore, synchronizing and calibrating the APs accurately is an unsolved problem today, especially due to the constraint of Listen Before Talk (LBT).

In some embodiments of the present invention, the (3G or 4G) cellular Observed Time Difference Of Arrival (OTDOA) positioning is augmented by increasing the number of virtual cellular sites, by adding additional positioning cells. Positioning cells are a type of femtocell that transmit special positioning beacons, but which do not necessarily provide other forms of cellular service as a typical base station or access point does. These positioning cells automatically learn the identities and synchronization of the cellular network around them, automatically configure themselves (with help from network, configuration device and configuration server), and then transmit their own positioning beacons only during time intervals when cellular phones listen for positioning beacons from the cellular network, without interfering with the network. Such positioning beacons may be referred to by other terms in different contexts, e.g., they may also be called p-beacons, positioning pilots, or positioning signals.

Figure 3:
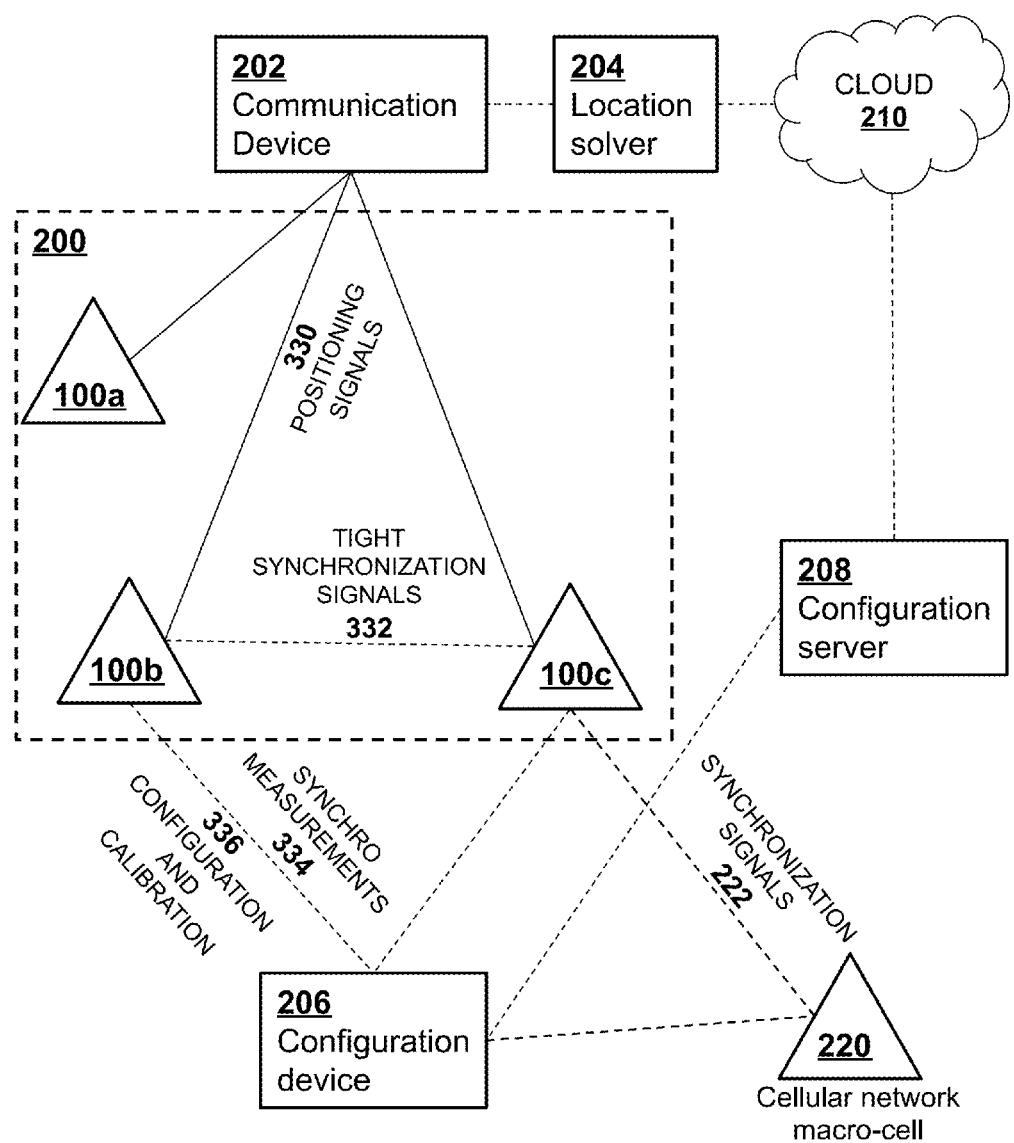
FIG. 3 is a block diagram illustrating a system for locating a communication device connected to the cloud, according to some embodiments of the present invention.

The connection between a positioning cell and the cellular network may be direct, or mediated by a configuration device 206, FIG. 3, that is connected to the cellular network; e.g., a cellular phone or another one of the positioning cells, and using a WiFi, Bluetooth or a cellular connection. Communication between the positioning cells and a communication device 202 used by a user to obtain the user's position may be in the licensed spectrum of the cellular network or in an unlicensed spectrum.

Therefore, an aspect of some embodiments of the present invention relates to a positioning system configured for being used in conjunction with a location solver 204 and a communication device 202 synchronized with a cellular network, where the positioning system comprises a plurality of positioning cells. Each positioning cell includes an transceiver configured for emitting and receiving radio-frequency signals, a memory unit configured for storing data, and a processing unit configured for processing data and for controlling an operation of the transceiver. At least one of the positioning cells is connected to or can hear a cellular network, and the positioning cells are configured for emitting respective positioning signals (i.e. positioning pilots, or positioning beacons) receivable by the communication device 202 in a frequency used by the cellular network. The positioning cells are also configured to receive a synchronization signal emitted by the cellular network. Synchronization signals are signals from the cellular network enabling devices or positioning cells to synchronize coarsely or tightly to the emitting macro cell(s) 220 and locate the time slot where the positioning cells can safely transmit without interfering with the cellular network. The synchronization signal preferably includes cell primary or secondary synchronization signals, cell reference signals, cell positioning signals (pilots), broadcast or multicast information to identify and locate the various signals and time slots. Coarse synchronization is of the order of 100 ns to 1000 ns, while tight synchronization is of the order to 3 ns to 30 ns. Each positioning signal includes data indicative of an identifier of the positioning cell that emitted the positioning signal. The location solver 204, which may be part of the communication device or a separate device, is in communication with the communication device 202. The location solver is configured for: (i) receiving from the communication device 202 first data indicative of times of arrival of the positioning signals to the communication device 202, each piece of data indicative of a time of arrival being appended with an identifier of the associated positioning cell; (ii) processing the times of arrival and using known positions of the positioning cells to determine a position of communication device 202 with respect to the positioning cells, e.g., using multilateration; and (iii) sending to the communication device 202, or to an application in the cloud 210, second data indicative of the position.

Optionally, the positioning cells are associated with respective physical cell identifications (PCIs) that do not necessarily have a global cell identification in the cellular network.

Preferably, the positioning signals are designed so that they do not interfere with the cellular network. For example, the positioning signals may include first positioning signals orthogonal to the positioning pilots of the cellular network in a time domain; second positioning signals orthogonal to the positioning pilots of the cellular network in a frequency domain; and/or third positioning signals transmitted during gaps in which nearby macro cells of the cellular network do not transmit positioning pilots or other data, where preferably the third positioning signals have a transmission power lower than a threshold power, so as not to overwhelm the positioning pilots transmitted by any farther macro cells transmitting at the same time.

Preferably, prior to the receiving of the synchronization signal, the positioning cells are configured for performing an analysis of the cellular network, and synchronizing with the cellular network based on the analysis, in order to determine appropriate timing for receiving at every cycle for respective time intervals within which the cellular synchronization signal is expected to arrive at the respective positioning cells. The positioning cells may further improve the accuracy of their synchronization to the cellular system using the cellular positioning signals or cell reference signals, and correcting for the known distances to the cellular network macro cells 220 (we denote by macro cell the cellular communication network cells, which can be macro, pico or small cells, capable of transmitting positioning signals and deployed by a cellular network operator, but which are not the positioning cells that are the subject of this application; macro cell may also denote an access point, a satellite transceiver or other transceiver from a general wireless network). Or they may synchronize coarsely to the cellular system using less accurate signals such as primary or secondary synchronization signals, or without correcting for the distances to the macro cells. Preferably, at least one positioning cell, such as a master positioning cell, should perform this operation and synchronize coarsely or tightly to the cellular network in order to locate the time slot allocated for transmitting the positioning signals without interfering with the cellular network. A software-customizable positioning cell can be automatically or manually selected to be a master or slave by the installer. Such a positioning cell selected to be a master cell is preferably located somewhat central to most other positioning cells, or such that it is able to hear the cellular network. The remaining positioning cells will then tightly synchronize to this master positioning cell. The coarse synchronization to the cellular network and the tight synchronization between the positioning cells is typically performed wirelessly, but could also be performed using wired connections.

Optionally, the positioning cells are configured for analyzing the cellular network by receiving a plurality of synchronization signals from a multitude of multi-operator cells of the cellular network; using predetermined information indicative of a distance travelled by each of the plurality of synchronization signals and of a constant timing offset between synchronization signals associated with different operators and frequency bands, to average the times of arrival of the plurality of signals.

Optionally, the positioning cells are configured for analyzing the cellular network by applying a predetermined filter to the plurality of synchronization signals to reduce effect of fluctuations in a synchronization of macro cells of the cellular network.

The positioning cells may be configured for transmitting the positioning signals in a spectrum of a given operator in the cellular network; a spectrum of a plurality of operators in the cellular network; and/or an unlicensed spectrum not associated with any operator in the cellular network.

Optionally, the positioning cells are configured for initially connecting to the configuration device 206 in a manner that does not use the cellular network, receive information relating to cellular network from the configuration device 206, and only then listening to the cellular network according to the received information relating to cellular network.

Optionally, each positioning cell transmits positioning pilots periodically with a predetermined period, e.g., 1 second or 10 seconds. The communication devices store the predetermined period and configuration, and can therefore listen for the positioning pilots during a short interval each period, without requiring a search phase for the positioning signals. This period may be identical across all venues using the system, and is essentially synchronized to some universal time. On the other hand, each venue may be allocated a different time slot within the period in order to increase the capacity of positioning cells. Any operator wishing to use the system should have a synchronized network, i.e. synchronized macro cells. Otherwise, it may instruct its users to listen to another operator's positioning signals if the two operators have an agreement, or to positioning signals transmitted in the unlicensed band.

Optionally, any given positioning cell is configured for listening to at least one previous positioning cell (i.e., a positioning cell that transmits a little earlier in the current positioning opportunity); determining the time difference between the time of arrival of the positioning signal (or tight synchronization signal) emitted by the previous positioning cell and a theoretical time of arrival that would occur if the positioning signal emitted by the previous positioning cell took a shortest path from the previous positioning cell to the given positioning cell; and emitting a respective positioning signal at a time interval following reception of the previous positioning cell's positioning signal, the time interval being equal to a predetermined transmission timing minus the time difference.

Optionally, a given positioning cell is configured to determine the time difference after subtracting the shortest path distance between the positioning cell and previous positioning cell, provided by, for example, server 204.

Optionally, the positioning cells are divided into groups; the positioning cells belonging to any same group are configured for emitting the respective positioning signals at the same time, which is different from the time when cells in the other groups emit their positioning signals; the cells in each group of positioning cells are configured for emitting the respective positioning signals simultaneously with other positioning cells in the same group, or in quick succession at respective times following the synchronization signal; a first positioning cell of any given group is configured for listening to a second positioning signal emitted by a second positioning cell of a different group; the first positioning cell is configured for determining a time difference between the time of arrival of the second positioning signal at the first positioning cell and a respective theoretical time of arrival that would occur if the second positioning cell were synchronized with the first positioning cell; the first positioning cell is configured for transmitting data indicative of the difference to the second positioning cell by wire or wirelessly; the second positioning cell is configured to adjust a timing of emission of the second positioning signal according to the difference, in order to synchronize with the first positioning cell. In some implementations, there may be more than one first positioning cell and more than one second positioning cell.

Optionally, a plurality of first positioning cells are configured for receiving at least some second positioning signals emitted by second positioning cells, the first positioning cells belonging to a same first group or to a plurality of distinct first groups; the first positioning cells are configured for creating a plurality of respective maps of time differences between the times of arrival of the second positioning signals and respective theoretical times of arrival that would occur if the second positioning cells were synchronized with the first positioning cells; the first positioning cells are configured for transmitting data indicative of the respective maps to the at least some second positioning cells by wire or wirelessly; each of the second positioning cells is configured for receiving the plurality of maps, and for extracting there from respective data relating to time differences associated with the second positioning signal emitted by the second positioning cell relative to the plurality of first positioning cells; each of the second positioning cells is configured for processing the data extracted from the plurality of maps to determine a respective adjustment in a respective timing of emission of the specific positioning signal, in order to synchronize with the plurality of second positioning cells, and with the plurality of the first positioning cells, in a present cycle or in a subsequent cycle.

Optionally, the map comprises information representing qualities of the positioning signals emitted by some of the second positioning cells; and each of the second positioning cells is configured for determining the respective adjustment by calculating a weighted average of time differences relative to the plurality of first positioning cells, each weight applied to a time difference being a measure of a quality of the positioning signal associated with the time difference.

Optionally, each of the first positioning cells is configured for receiving the at least some second positioning signals emitted by the at least some second positioning cells which do not belong to a group of the first positioning cell. Optionally, at least one group consists of a single positioning cell. Optionally, at least one group consists of two or more positioning cells. Optionally, a given positioning cell is assigned to more than one group.

Optionally, the at least one first positioning cell is configured to determine the time difference by one of: having access to a distance of the shortest path from the at least one second positioning cell, and calculating the time difference; relaying the time of arrival of the second positioning cell to a configuration device or configuration server, and receiving from the configuration device or configuration server the time difference.

Optionally, each first positioning cell is configured to determine the map by one of: having access to information indicative of distances of the first positioning cell from the at least some second positioning cells, and calculating time differences between the times of arrival of the second positioning signals and respective theoretical times of arrival that would occur if the second positioning cells were synchronized with the first positioning cells; relaying the times of arrival of the second positioning cells to a configuration device or configuration server, and receiving from the configuration device or configuration server the map.

Optionally, (i) the first positioning cell is a master positioning cell synchronized with the cellular network, the master positioning cell being configured for emitting a tight synchronization signal ($400d$ in FIG. 4D) at every cycle in response to a reception of each cycle's synchronization signal. A tight synchronization signal from master or slave positioning cell is a signal enabling tight synchronization between the master and slave positioning cells, and transmitted in same frequency band or different frequency band, in licensed or unlicensed band; the tight synchronization signal $400d$ can be the positioning pilots $402d$ of the master or slave positioning cells, or some reserved signal using, optionally, lower power or shorter burst; tight synchronization enables synchronization to an accuracy of about 1 meter, i.e. about 3 ns. In addition, (ii) a plurality of second positioning cells are slave positioning cells, configured for turning on for a predetermined time length at every cycle in order to listen for the tight synchronization signal; receiving the tight synchronization signal; and emitting second positioning signals $402d$ at a predetermined time period following reception of the tight synchronization signal $400d$, such that the second positioning signals are received by the communication device 202 shortly after the communication device 202 receives the first positioning pilots, while the communication device 202 still listens; the idea is that the user does not wait too long between master positioning signal and slaves positioning signals in order to save battery; but more importantly, we have the following constraint: the slaves transmit relatively quickly after hearing the master beacon before their timing drifts. The drift can be a few meters per second or per 10 seconds. Hence, the slave should transmit shortly after the master beacon. Additionally, (iii) the master positioning cell is configured for receiving the slave positioning signals and compiling a map of time differences between the times of arrival of the slave positioning signals and respective theoretical times of arrival that would occur if the slave positioning cells were synchronized with the first master positioning cell; In this case, the master does not transmit at the same time as the slaves. Additionally, (iv) the master positioning cell is configured for sending data indicative of the map to the slave positioning cells; This calibrates the second positioning cells (slave positioning cells) among each other but it does not calibrate the master positioning cell with the slave positioning cells. Every now and then, another group should be formed in order to calibrate the master positioning cell. Additionally, (v) each slave positioning cell is configured for extracting from the data indicative of the map respective information indicative of a respective adjustment in timing of emission of the respective slave positioning signal for a subsequent cycle; (vi) in the subsequent cycle, each slave positioning cell is configured for adjusting the time of emission and for adjusting a beginning and end of the predetermined time length.

Optionally, the master positioning cell is in line of sight with all the slave positioning cells.

Figure 4A:
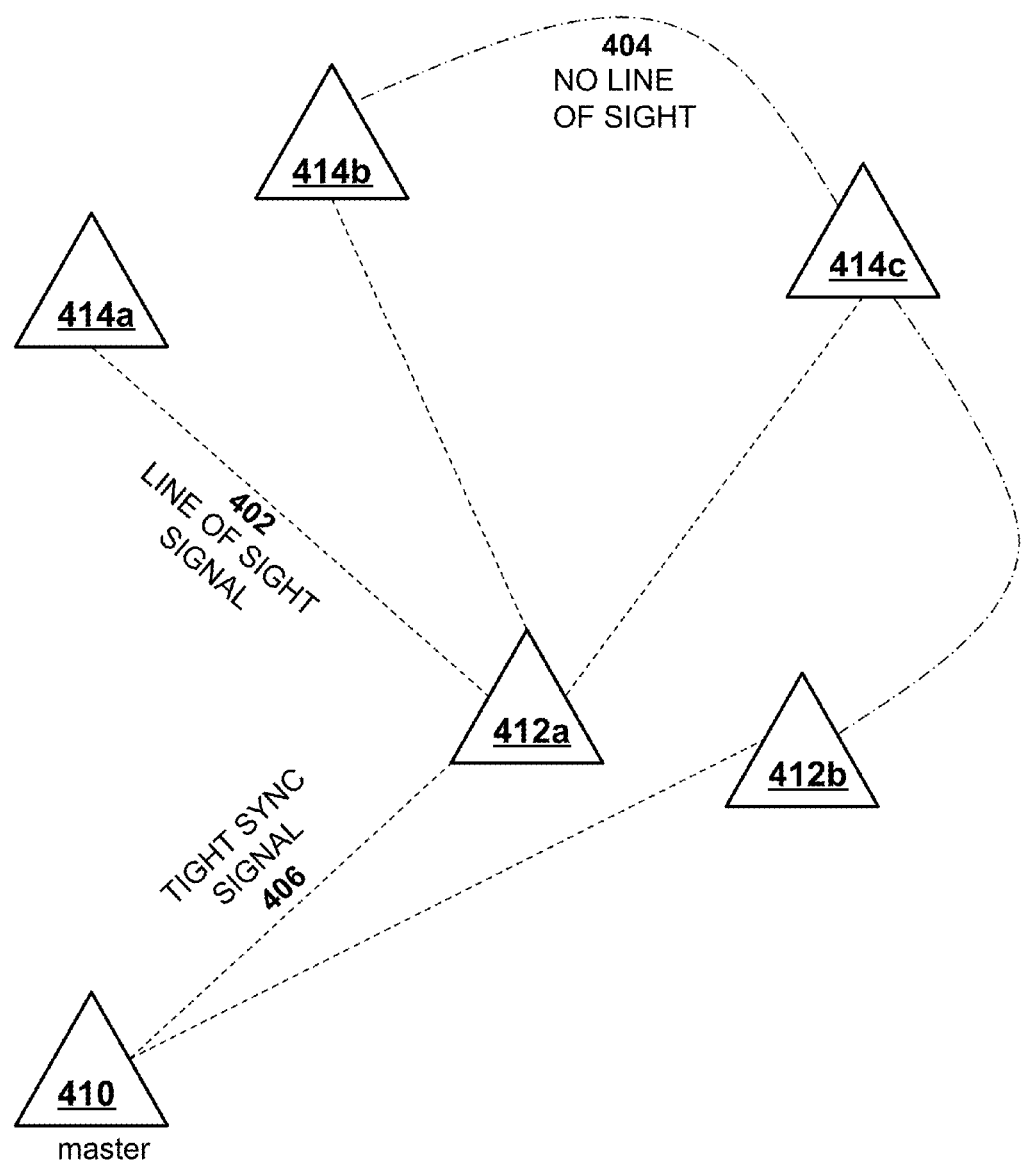
FIG. 4A is a schematic diagram illustrating a set of positioning cells in a venue where we place certain positioning cells in (near) line-of-sight with respect to other positioning cells in order to achieve tight synchronization between all positioning cells, according to some embodiments of the present invention.
Figure 4B:
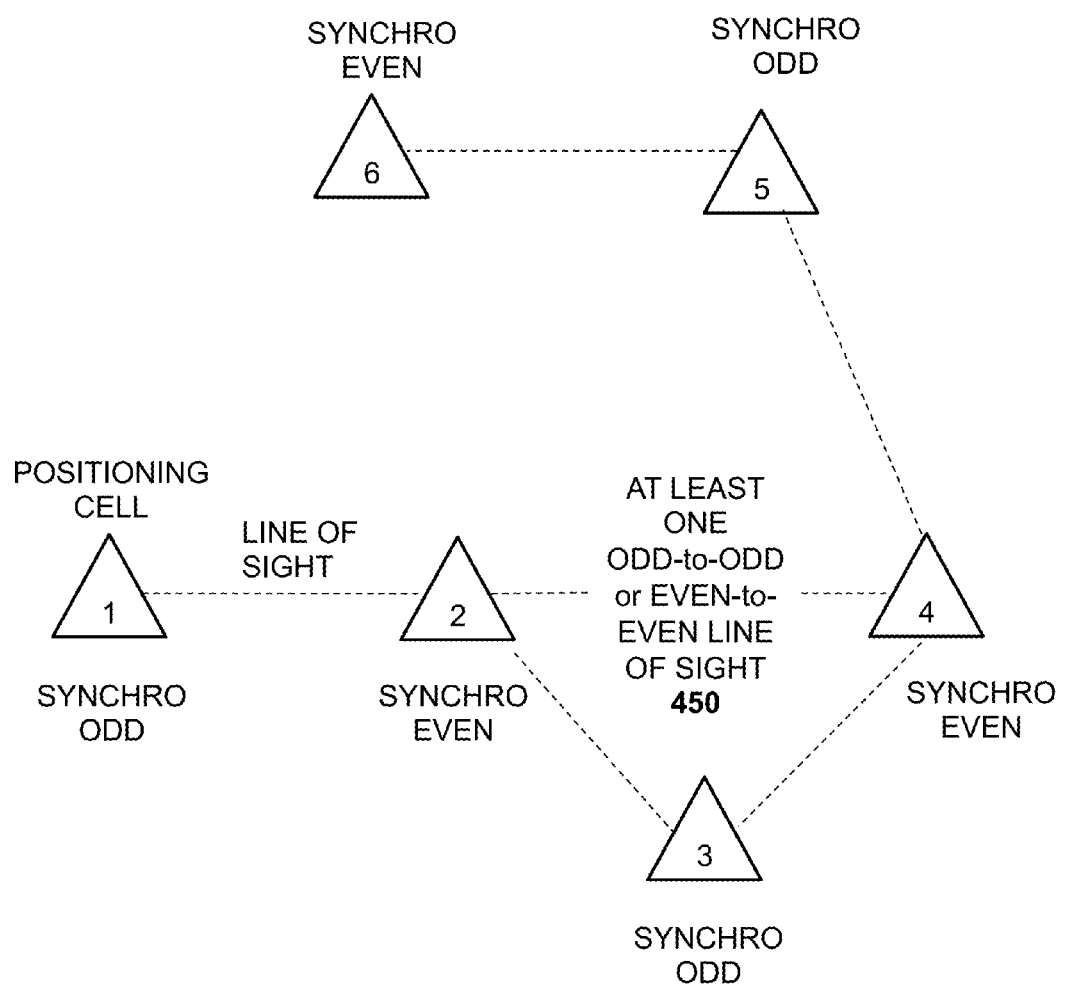
FIG. 4B is a schematic diagram illustrating the minimum condition in terms of line-of-sight visibility between positioning cells allowing tight synchronization, according to some embodiments of the present invention.
Figure 4C:
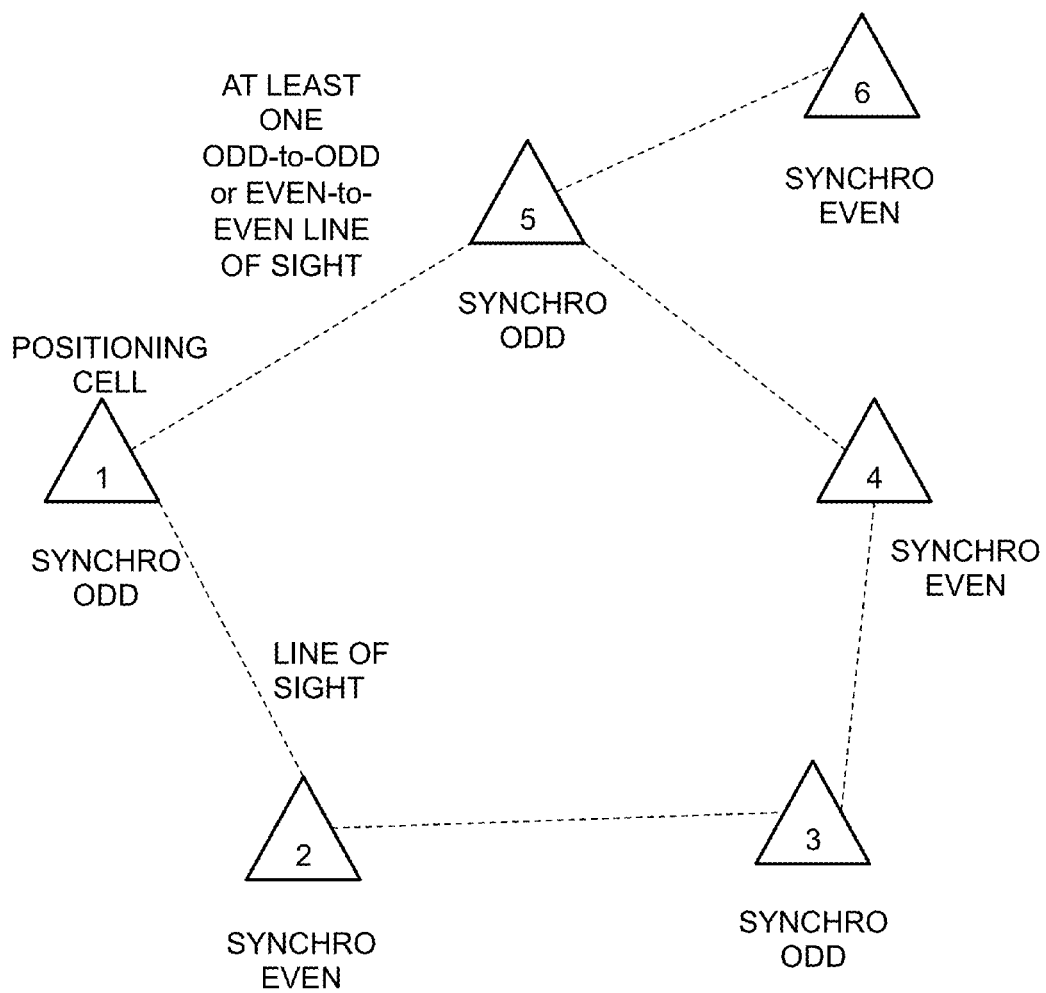
FIG. 4C is a schematic diagram illustrating another example of minimum condition in terms of line-of-sight visibility between positioning cells allowing tight synchronization, according to some embodiments of the present invention.
Figure 4D:
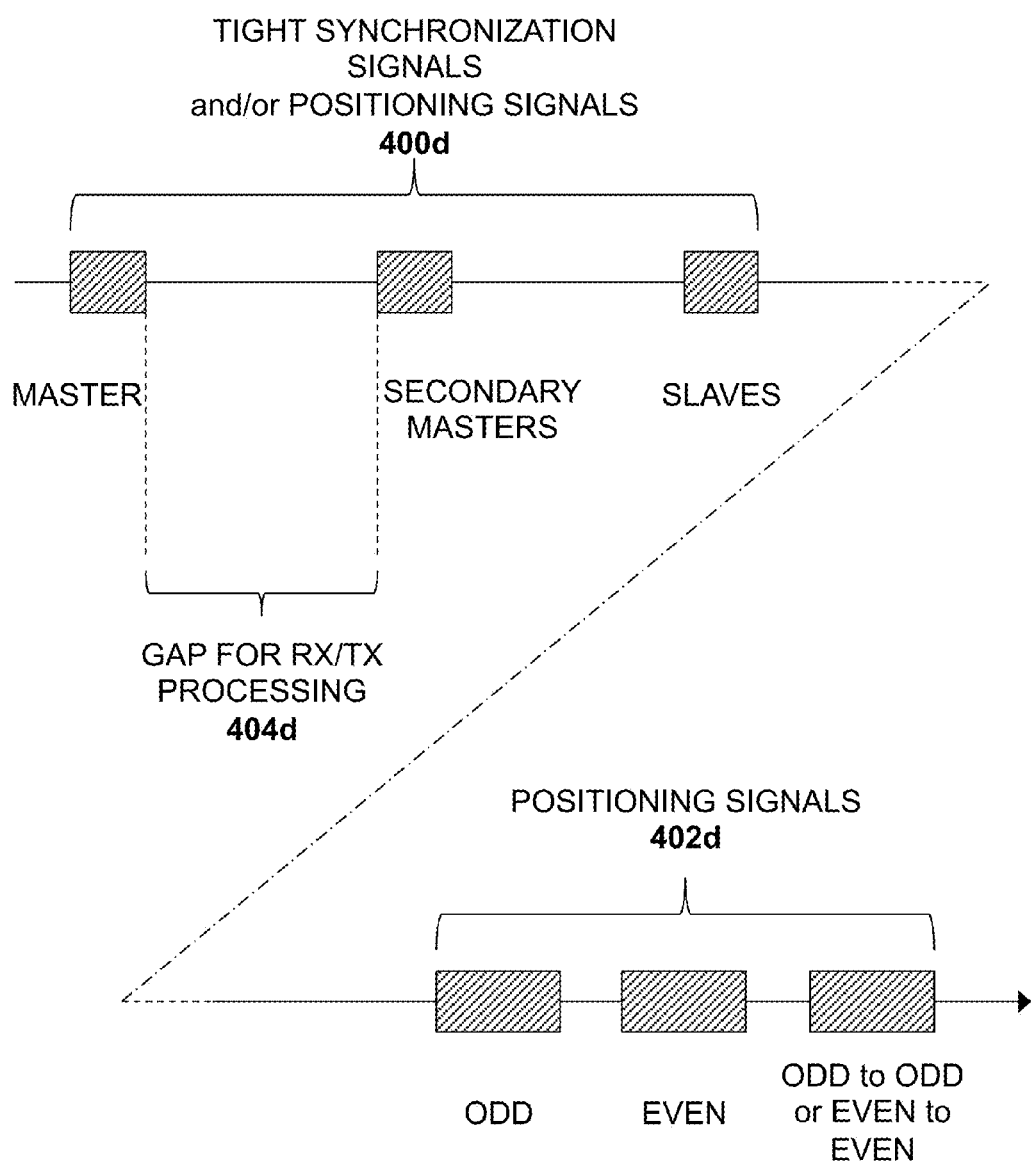
FIG. 4D is a general transmission diagram of tight synchronization signals (between positioning cells) and positioning signals (toward the communication device), according to some embodiments of the present invention.

As shown in $404d$ of FIG. 4D, a receive to transmit time gap is provided for the positioning cells, between receiving a tight synchronization signal and transmitting a positioning signal (or transmitting another tight synchronization signal) in order to allow them enough processing time between the reception of signals and transmission of their own signals, after readjusting their synchronization.

Coarse Synchronization, Tight Synchronization, and RF Calibration Procedures

The master positioning cell synchronizes coarsely to the network and, with the help of the configuration device and configuration server, locates the time slots where the positioning cells could transmit in licensed band without interfering with the cellular network, or where it could transmit in a given licensed or unlicensed band, at a given time that can be quickly located by the communication device without extensive search.

The slave positioning cells obtain this coarse synchronization either by listening to messages from the master positioning cell, in licensed or unlicensed spectrum, or by listening to the cellular network; and they obtain the remaining configuration from the configuration device and configuration server.

Less than one second before the positioning cells transmit their positioning signals, ideally 1 ms to 100 ms before, the master positioning cell 410 transmits a tight synchronization signal 406 that one or more first slave positioning cells $412a$, $412b$, in direct Line-of-Sight (LoS) to the master positioning cell, as shown in FIG. 4A, will hear. These first slave positioning cells 412a, 412b will estimate its time of arrival, will subtract the theoretical time of flight of the signal, will learn by how much their clock drifted with respect to this signal, and then will adjust their clock to realign with this signal and resynchronize with the master positioning cell.

Within a few milliseconds afterwards, after resynchronizing their clocks, the first slave positioning cells 412a, 412b will in turn transmit tight synchronization signals that one or more second slave positioning cells 414a, 414b, 414c, preferably in direct LoS to the first slave positioning cells, will hear, will estimate its time of arrival, will subtract the theoretical time of flight of the signal, will learn by how much their clock drifted with respect to this signal, and then will adjust their clock to realign with this signal and resynchronize with the master positioning cell. Preferably, each pair of positioning cells which are not in LoS, i.e. the two positioning cells are in Non-Line-of-Sight NLOS 404, are not involved in direct measurements of their signals for tight synchronization or RF calibration; the reason being that the measurement quality is degraded by the NLOS situation.

And so on until all slave positioning cells are synchronized with the master positioning cell. At this stage, within less than 1 second before their clocks drift, all positioning cells will transmit positioning signals, simultaneously or in quick succession, in the same or in different band from the tight synchronization band. Optionally, the tight synchronization signals are the positioning signals themselves and there is no need to retransmit positioning signals.

For the tight synchronization procedure to work, during a preliminary initialization procedure, the configuration device and configuration server inform each positioning cell of its role and of the positioning cell it should listen to and synchronize to, and the distance or time of flight to this positioning cell. The emitting positioning cell and listening positioning cell will ideally be in direct LoS for best synchronization accuracy. The configuration device and configuration server construct a map with LoS links and paths, moving from the master positioning cell to each slave positioning cell, like a tree starting from the master positioning cell and branching to a first set of slave positioning cells, and then branching again to a second set of slave positioning cells, and so on until all slave positioning cells have been reached. In one extreme (least desirable), the tree may be in the form of one long branch, i.e. a straight line where reaching the last slave positioning cell requires going through all other positioning cells. In another extreme, each slave positioning cells are directly linked in LoS to the master positioning cell.

Figure 7:
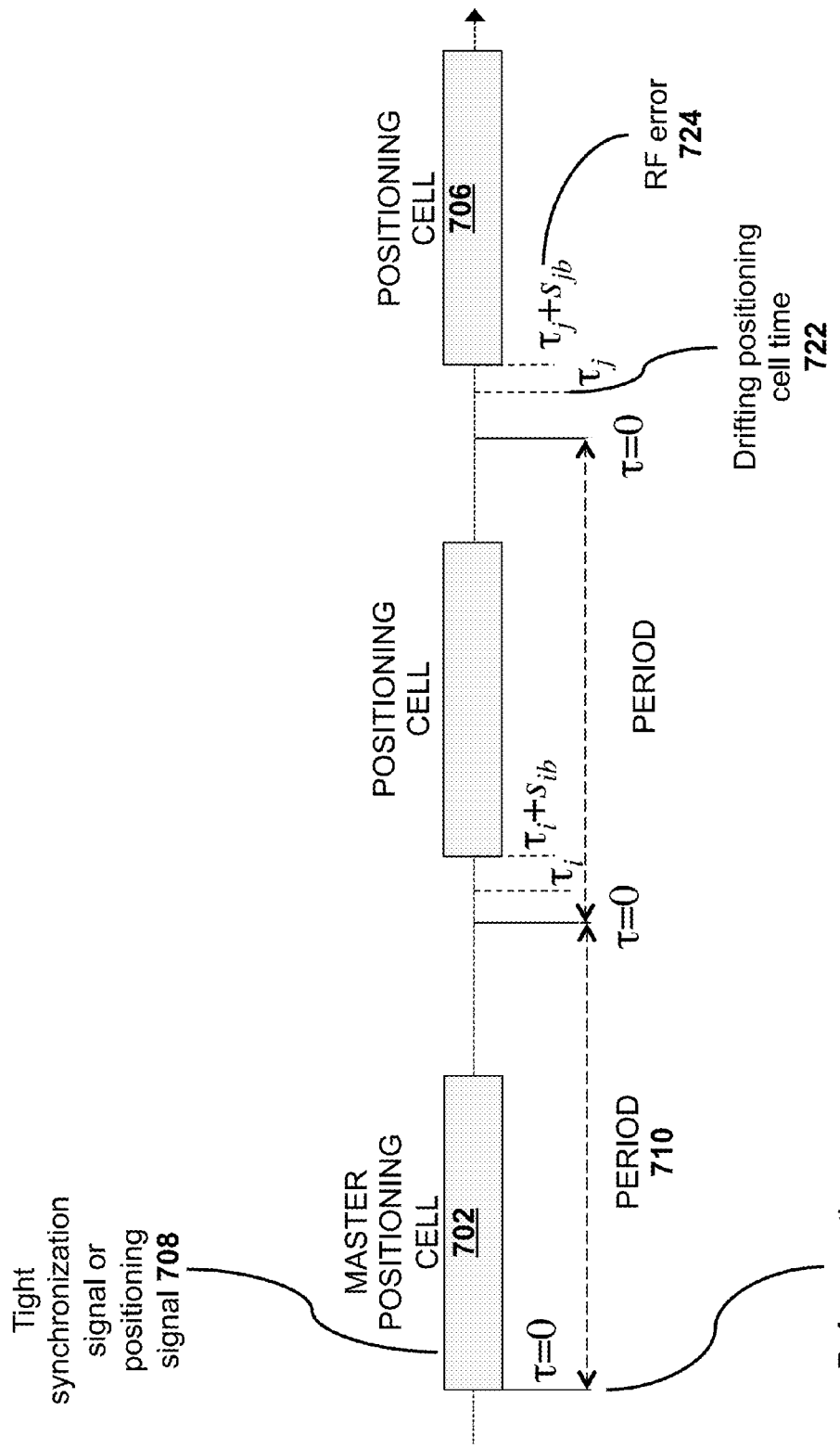
FIG. 7 is a schematic diagram illustrating the transmission of tight synchronization and positioning signals, and the expected time drifts before accurate synchronization and calibration are achieved.

As shown in FIG. 7, the master positioning cell 702 and the slave positioning cells i 704 and j 706 transmit tight synchronization signals or positioning signals 708. In this example, each positioning cell also listens to the positioning cell that has transmitted earlier. The transmission period 710, in this example, is the ideal time delay between the cells' transmissions, and that can be achieved once accurate synchronization and calibration are performed. However, we observe time drifts due to clock differences and RF differences between the hardware of the positioning cells.

Let us assume that the positioning cell j listens to positioning cell i in order to find its synchronization error. The general formula of the time of arrival estimation measured by positioning cell j of the received tight synchronization or positioning signal from positioning cell i is $$t_{ij} = d_{ij} + (\tau_i + s_{ib}) - (\tau_j - s_{jb}) + n_{ij}$$

Where $t_{ij}$ is the measured time of arrival of the tight synchronization signal transmitted by positioning cell i and received by positioning cell j. $\tau_i$ 722 is the time reference in the positioning cell i, and $\tau_j$ 722 the time reference in the positioning cell j. The time references are referenced to the master positioning cell's time reference 720 (whose $\tau=0$). Hence, $\tau_i$ and $\tau_j$ are accumulated drifts with respect to the previous positioning opportunity, and will be re-corrected during each tight synchronization opportunity. $s_{ib}$, respectively $s_{jb}$, 724, is a receive to transmit RF calibration error that adds to the time offset of positioning cell i, respectively cell j, relative to the master positioning cell and that depends on the TX and RX electronics of each positioning cell, on temperature, as well as on the frequency band b where the tight synchronization signal is being transmitted. The main difference between $\tau_x$ and $s_x$ where x is the index i or ib, etc., is that $\tau_x$ is a short-term drift that varies due to clock and drift estimation inaccuracy, while $s_x$ is a long-term drift that changes with temperature, for example. $\tau_x$ should be estimated in every period of say 10 seconds. While $s_x$ may be estimated in every period of, say, 1 hour. Furthermore, $s_x$ can depend on the frequency band used by the tight synchronization signal if it is different from the frequency band used by the positioning signal.

All time quantities are assumed normalized to distances by multiplying them by the speed of light. $d_{ij}$ is the distance traveled by the signal from positioning cell i to positioning cell j. $n_{ij}$ is the estimation noise.

We will explain later how $s_{ib}$, $s_{jb}$ are determined by the positioning cells. We assume for now that they are known. $d_{ij}$ is determined by the network installer, stored in the configuration server, and copied into the receiving positioning cell j by the configuration server and configuration device. $\tau_i + s_{ib} = 0$ if positioning cell i has properly synchronized to the master positioning cell (a little earlier, before sufficient drift occurs again). $t_{ij}$ is estimated as the time of arrival of the tight synchronization signal. $n_{ij}$ is ideally a small noise that can be neglected in LoS condition. Therefore, the positioning cell j can compute its time reference according to $$\tau_j \approx t_{ij} - d_{ij} - s_{jb}$$

and correct it. Its transmission will be aligned with the master positioning cell's transmissions plus the desired period.

This method also includes calibrating the RF transceivers of the slave positioning cells relative to the master positioning cell, i.e. estimating the quantity $s_{jb}$ for a given band b relative to the band where the positioning signals are transmitted. This procedure is denoted by RF calibration and can be achieved regularly or every now and then, by having positioning cells listen to adjacent positioning cells, preferably in direct LoS (402 in FIGS. 4A, 4B, 4C), when they transmit positioning signals in the desired frequency band. An adjacent positioning cell in this context is defined as a positioning cell that can be heard in direct LoS by the positioning cell of interest. A non-adjacent positioning cell is defined as a positioning cell that cannot be heard in direct Line-of-Sight by the positioning cell of interest; i.e. it is located in Non-Line-of-Sight (NLOS), and its signals maybe be blocked by obstacles or may suffer from multipath interference (e.g. the signal bouncing off the walls). For example, each of FIGS. 4B, 4C, 4E, 4F shows LoS paths (straight dotted lines) connecting a sequence of positioning cells (triangles representing the positioning cells).

Figure 4E:
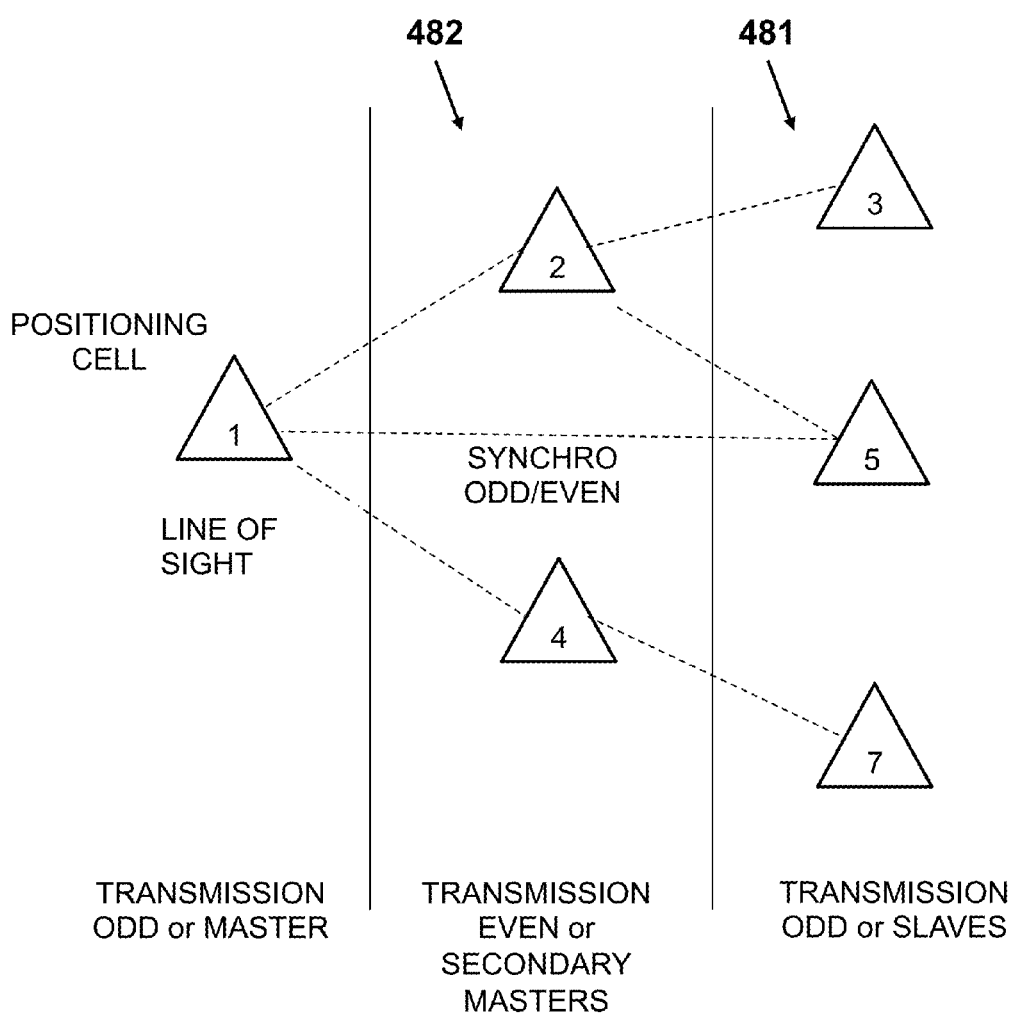
FIG. 4E is a diagram illustrating a method where tight synchronization and positioning signals are unified, according to some embodiments of the present invention.

In some embodiments, the positioning cells in the system are grouped into even groups and odd groups. For example, FIG. 4E shows even group 482 and odd group 481. FIG. 4F shows even group 484 and odd group 485. The odd numbered cells can listen to adjacent even numbered positioning cells when the latter transmit positioning signals. And likewise, the even numbered positioning cells can listen to the odd numbered cells when the latter transmit their positioning signals. Additionally, at least one even numbered positioning cell should be given the opportunity to listen to at least one odd numbered positioning cell's positioning signal, or vice versa, and preferably with direct LoS visibility 450. FIG. 4G shows how the cells in FIG. 4F may be geographically connected from the point of view of LoS. This scheme is also illustrated in FIG. 4D. The positioning signals 402*d* are first transmitted from the odd numbered positioning cells (the even positioning cells listen for RF calibration of the odd positioning cells), for example, followed by the transmission from the even numbered positioning cells (the odd positioning cells listen for RF calibration of the even positioning cells), and followed by the transmission from one or more odd positioning cells (the remaining odd positioning cells listen for odd to even RF calibration).

The positioning signals do not need to be started by the master positioning cell and the master positioning cell may not necessarily play a special role in the positioning signals (unless the positioning signals and tight synchronization signals are combined into the same signals). The master positioning cell plays the important role in the tight synchronization procedure as it defines the timing tempo that all slave positioning cells should accurately track. Furthermore, a slave positioning cell may not directly listen to the master positioning cell; it may listen to an (intermediate) slave cell that has already tightly synchronized to the master positioning cell.

Each positioning cell measures the time difference between the positioning signals of at least 2 adjacent positioning cells it is adjacent to in direct LoS. If a positioning cell is adjacent to only one positioning cell in direct LoS, then such cell cannot participate in the following procedure.

The time of arrival estimation formulas for the signals transmitted by positioning cells i, i' and received by positioning cell j are given by $$t_{ij} = d_{ij} + (\tau_i + s_{ib}) - (\tau_j + s_{jb}) + n_{ij}$$

Where the quantities have been described above, and where $\tau_x + s_x$ are residuals relative to corrections that have so far been made. If there are no drifts and no variations due to RF, these residuals are equal to 0.

Subtracting the 2 formulas and ignoring the small noise leads to $$(\tau_i + s_{i'b}) - (\tau_i + s_{ib}) \approx t_{i'j} - t_{ij} - d_{i'j} + d_{ij} = \epsilon_{i'ij}$$

The right-hand side term $\epsilon_{i'ij}$ is a small drift error between positioning cells i and i' and measured by positioning cell j. The term $(\tau_i + s_{ib}) = \epsilon_i$ is a small drift error that can be obtained recursively via the path connecting the master positioning cell to positioning cell i. The term $\epsilon_i$ will therefore be corrected in a recursive manner (after correcting the term for all preceding positioning cells linking positioning cell i to the master positioning cell) and will converge to zero. Therefore, the only remaining term is $$(\tau_i + s_{i'b}) \approx \epsilon_{i'ij}$$

and can be estimated by positioning cell j and forwarded to the positioning cell i' for correction. Since positioning cell i' assumes it has already corrected its own $\tau_{i'}$, therefore the quantity $\epsilon_{i'ij}$ will be equal to any change in $s_{i'b}$. Hence, positioning cell adds this quantity to its internal value stored for $s_{i'b}$ (accumulative corrections). In the event an estimation error occurs, at the next RF calibration opportunity this value will be corrected. It is therefore preferred not to delay substantially the next RF calibration opportunity.

Initially for a band, the quantity $s_{i'b}$ maybe initialized to zero or to a reasonable value. After the first RF calibration procedure, we determine its value for frequency band b. Then we track its slowly changing value over time, usually due to temperature changes. We can also measure its value for different frequency bands where tight synchronization can take place.

Multilateration Procedure

Figure 6:
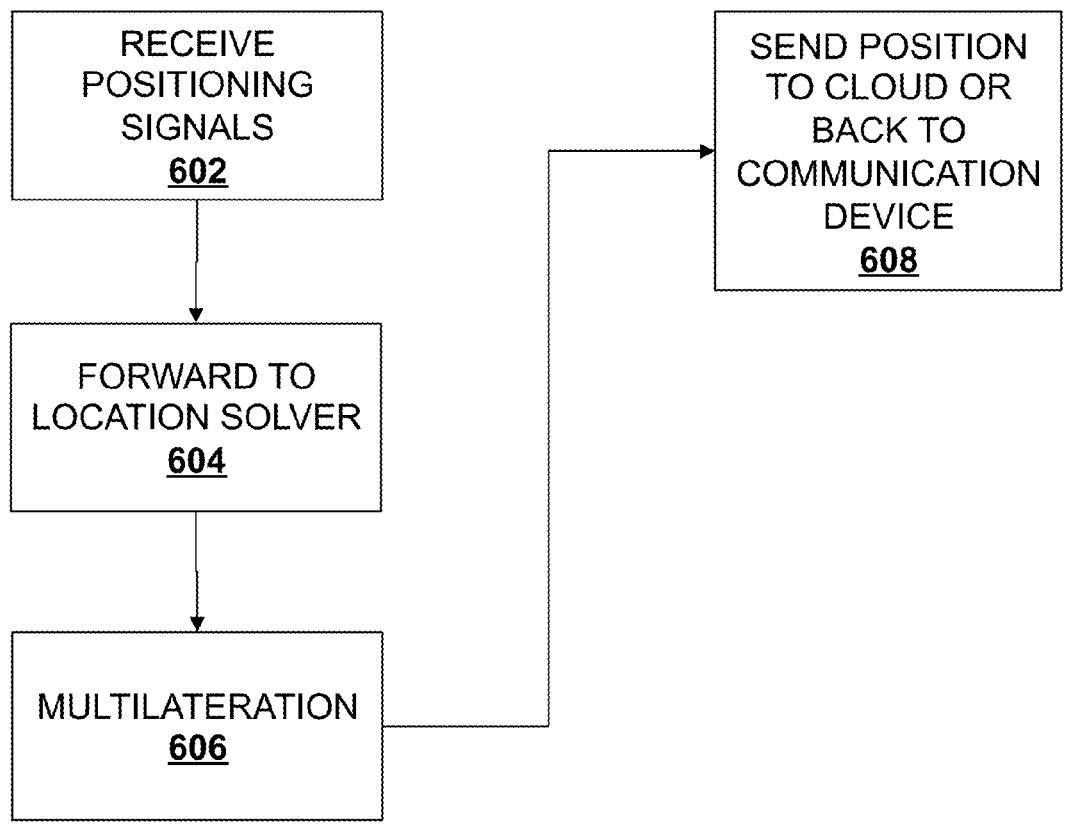
FIG. 6 is a flow diagram illustrating the communication device's state machine, according to some embodiments of the present invention.

As shown in FIG. 6, the localization procedure of the communication involves the following steps: 602 receive positioning signals from several positioning cells and measure the time of arrivals of each; 604 forward the measurements to the location solver, which may be located inside the communication device; 606 the location solver performs on the measurements a multilateration operation to compute the position of the communication device, which requires knowledge of the locations of the positioning cells and the time of transmission of each; 608 send the estimated position back to the communication device.

Tight Synchronization of Multiple Domains with at Least One Positioning Cell in the Intersection Two or more intersecting domains can optionally tightly synchronize to improve overall communication device accuracy.

Optionally, the system includes a plurality of master positioning cells, and a plurality of slave positioning cells wherein: the master positioning cells are configured for synchronizing with each other; following the synchronization, the master positioning cells are configured for emitting respective tight synchronization signals at each cycle, each of the slave positioning cells is configured for: receiving the plurality of tight synchronization signals, calculating theoretical times of arrival of the tight synchronization signals by using respective known distances of the slave positioning cell from the master positioning cells; calculating a plurality of differences, each difference being a difference between the theoretical time of arrival associated with a respective master and a time of arrival of the respective master's tight synchronization signal; selecting the smallest reliable difference (where reliable can mean, for example, a minimum acceptable SNR level, or other minimum quality level, of the received signal); and emitting a slave positioning signal at a predetermined time following the time of arrival of the tight synchronization signal associated with the smallest reliable difference.

Optionally, the master positioning cells are not in line of sight with each other and the tight synchronization between them is achieved by following a path of Line-of-Sight links from the master positioning cells, going through one or more slave positioning cells and reaching a secondary master positioning cell. Each positioning cell listens to the signal from the predecessor, synchronizes to the predecessor, then transmits its own positioning signal.

This step is performed ahead of tight synchronization to the remaining slaves. Essentially, the two or more domains appear as one large domain where the tight synchronization signals are quickly forwarded to a secondary master in order to quickly start dispatching in turn to its neighboring slave positioning cells. Optionally, the main master slave is located toward the intersection of the two or more domains to speed up the tight synchronization phase.

Optionally, (i) the master positioning cells comprise a main master positioning cell and a plurality of secondary master positioning cells; (ii) the positioning cells are subdivided into 3 groups, the main master positioning cell group, the secondary master positioning cells group and the slave positioning cells group; (iii) the main master positioning cell is configured for emitting a master tight synchronization signal upon reception of the synchronization signal from the cellular network, and the secondary master positioning cells are configured for listening to the main master positioning cell, synchronize to the tight synchronization signal, and then emitting respective secondary tight synchronization signals at predetermined times following the master tight synchronization signals; (iv) each of the slave positioning cells is configured for: receiving the plurality of master tight synchronization signals, calculating theoretical times of arrival of the master tight synchronization signals by using respective known distances of the slave positioning cell from the master positioning cells; calculating a plurality of differences, each difference being a difference between the theoretical time of arrival associated with a respective master positioning cell and a time of arrival of the respective master tight synchronization signal; selecting the smallest reliable difference; and emitting a slave positioning signal at a predetermined time following the time of arrival of the master tight synchronization signal associated with the smallest reliable difference.

Optionally, the cloud service 210 comprises a plurality of processing elements distributed over a plurality of locations.

Optionally, the cloud service 210 is configured for using the processing units associated with the positioning cells and/or the configuration server.

Another aspect of some embodiments of the present invention relates to a positioning system configured for being used in conjunction with a location solver and a communication device 202 synchronized with a cellular network, the positioning system comprising a plurality of positioning cells. Each positioning cell comprising an transceiver configured for emitting and receiving radio-frequency signals, and being associated with a non-volatile memory unit configured for storing data, a processing unit configured for processing data and for controlling an operation of the transceiver, and a power source configured for powering the transceiver. At least one of the positioning cells is connected to a cellular network, and the positioning cells are configured for emitting respective positioning signals receivable by the communication device 202 in a frequency used by the cellular network, in response to the reception of a synchronization signal emitted by the cellular network, each positioning signal comprising data indicative of an identifier of the positioning cell that emitted the positioning signal; the location solver is in communication with the communication device 202, the location solver being configured for: receiving from the communication device 202 first data indicative of times of arrival of the positioning signals to the communication device 202, each piece of data indicative of a time of arrival being appended with an identifier of the associated positioning cell; processing the times of arrival and using known positions of the positioning cells to determine a position of communication device 202 with respect to the positioning cells; and sending to the communication device 202 [or to the cloud] second data indicative of the position. The positioning cells comprise a master positioning cell and a plurality of slave positioning cells, the master positioning cell being synchronized with the cellular network, and being configured for emitting a tight synchronization signal at every cycle in response to a reception of each cycle's synchronization signal; the slave positioning cells are configured for: turning on for a predetermined time length at every cycle in order to listen for the tight synchronization signal; receiving the tight synchronization signal; and emitting second positioning signals at a predetermined time period following reception of the tight synchronization signal, such that the second positioning signals are received by the communication device 202 shortly after the communication device 202 receives the first positioning pilots, while the communication device 202 still listens.

Optionally, each slave positioning cell is configured for transmitting during a respective time slot, so that the slave positioning cells are configured for transmitting sequentially one after the other in quick succession.

Optionally, each slave positioning cell is configured for: listening to at least one previous master or slave positioning cell; determining the time difference between the time of arrival of the slave positioning signal emitted by the previous master or slave positioning cell and a theoretical time of arrival that would occur if the master or slave positioning signal emitted by the previous master or slave positioning cell took a shortest path from the previous master or slave positioning cell to the given slave positioning cell; and emitting a respective slave positioning signal at a time interval following reception of the previous master or slave positioning cell's positioning signal, the time interval being equal to a predetermined delay minus the time difference.

Figure 1:
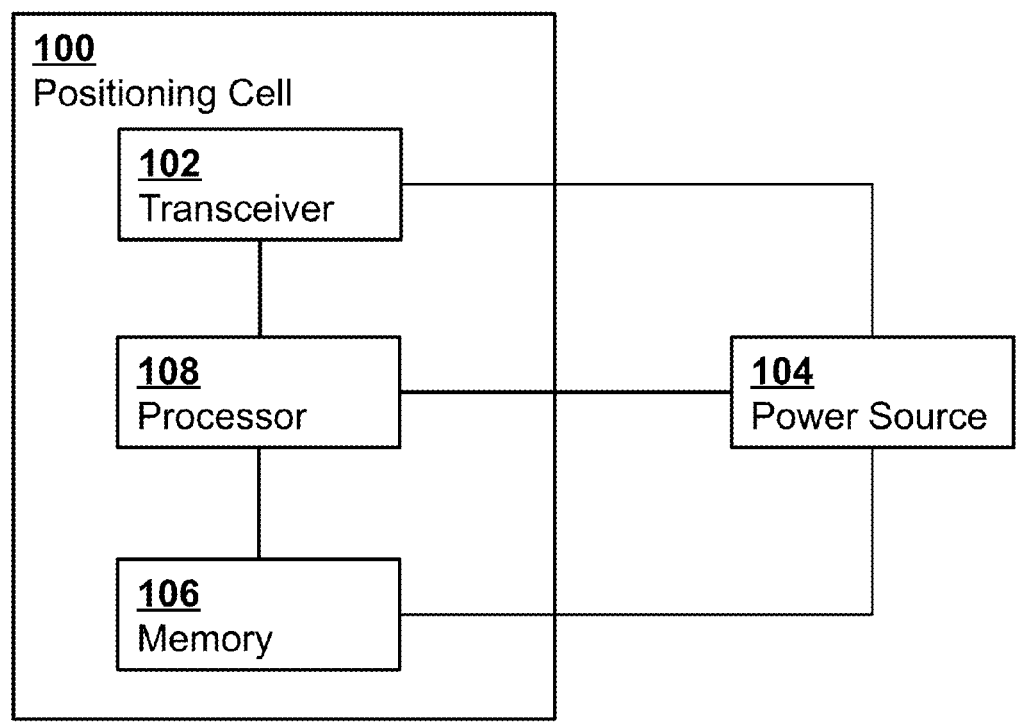
FIG. 1 is a block diagram illustrating a positioning cell, according to some embodiments of the present invention.

FIG. 1 illustrates a structure of positioning cells of the present invention. A positioning cell 100 of the present invention includes an transceiver 102 configured for receiving and emitting radio frequency (RF) signals, and is associated with a power source 104, a memory unit 106 configured for storing data, and a processing unit 108 configured for receiving, processing, and outputting data, and for controlling an operation of the transceiver according to stored, input, or outputted data. The transceiver 102 is configured, inter alia, for emitting positioning signals which include data indicative of the identity of the positioning cell that has emitted the signal.

In the embodiment of FIG. 1, the positioning cell 100 is a self-contained device which includes the transceiver 102, a respective memory unit 106, and a respective processing unit 108. The positioning cell 100 may be connected to an external power source 104, as shown, or it may include its own internal power source. A positioning cell may be implemented in the form or part of a cellular base station (e.g. macro-, micro-, pico- or femto-cell), a gateway device (e.g. home DOCSIS modem/router) or other wireless device (e.g. WiFi access point). It may also be implemented as a dedicated positioning cell.

Figure 2:
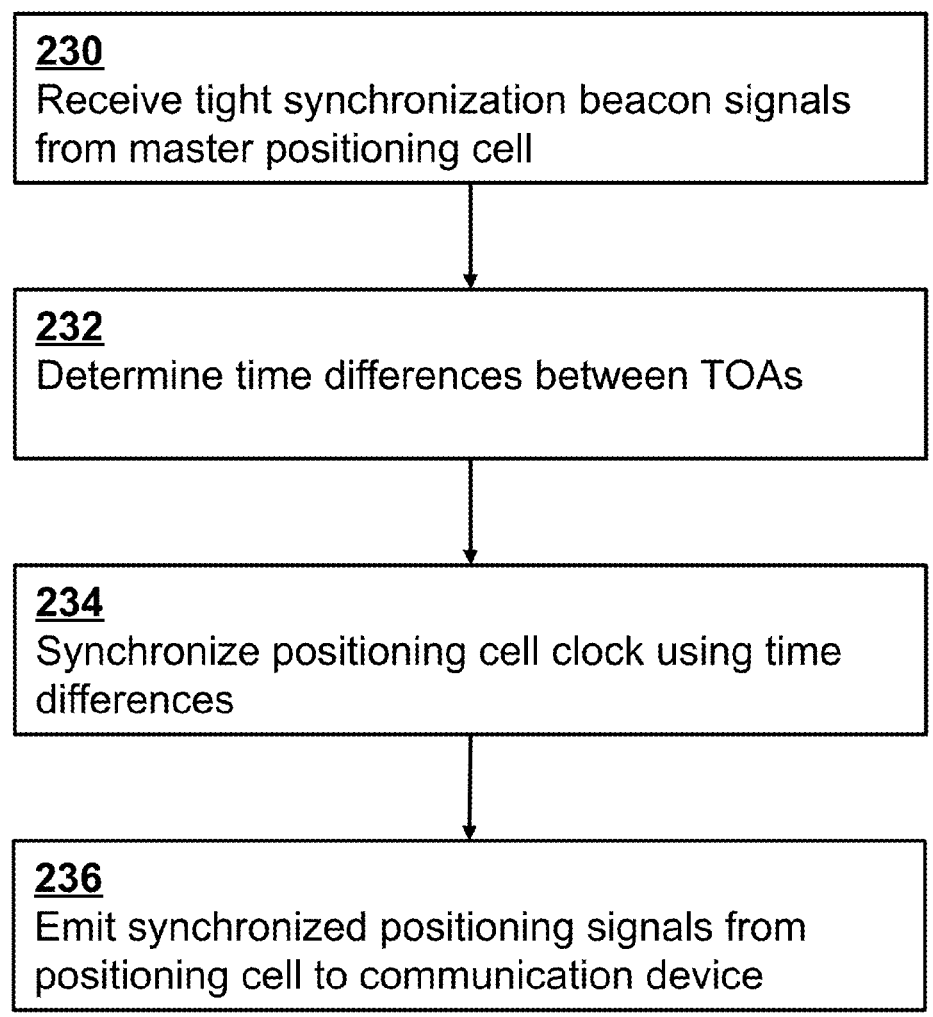
FIG. 2 is a flow chart outlining a method implemented by a positioning cell for supporting positioning determination of a communication device in a wireless communication network

FIG. 2 outlines steps of a method implemented by a positioning cell for supporting positioning determination of a communication device in a wireless communication network. In step 230, the positioning cell receives from a master positioning cell a plurality of tight synchronization signals. In step 232, the positioning cell determines a plurality of time differences between times of arrival of the plurality of tight synchronization signals and theoretical times of arrival of the plurality of tight synchronization signals. The theoretical times of arrival are corrected by theoretical times of flight along a direct line-of-sight path from the master positioning cell to the positioning cell. In step 234, the positioning cell synchronizes its clock based on one or more of the received tight synchronization signals adjusted by one or more of the plurality of time differences. In step 236, the positioning cell emits to the communication device in the wireless network a positioning signal at a time determined by its tightly synchronized clock; wherein the positioning signal comprises data or timing indicative of an identifier of the positioning cell; wherein the positioning signal is transmitted so as not to interfere with positioning pilot signals transmitted by the wireless network.

Reference is now made to FIG. 3, which is a block diagram illustrating a positioning system, according to some embodiments of the present invention.

The system 200 includes a plurality (two or more) positioning cells 100a, 100b, 100c, at least one of which is in direct or indirect communication with a macro cell 220 of the cellular network and with the cloud 210. The system 200 is configured for being used in conjunction with a communication device 202 communicating with the cellular network and a location solver 204. The communication device 202 may be a cellular phone, a tablet, a laptop computer, and is configured for receiving positioning signals 330 from the positioning cells 100a, 100b, 100c. The communication device 202 records the times of arrival of the different positioning signals, and sends the times of arrival and identifiers of the positioning cells appended to each time of arrival to the location solver 204. The location solver 204 may optionally reside inside the communication device; if it resides outside the communication device, e.g. in the cloud, then the communication between communication device and location solver occurs over WiFi, Bluetooth or cellular signals, for example. The location solver 204 has access to data indicative of the positions of the positioning cells, that may have been input into the location solver when the system 200 is set up, regularly updated via the configuration server 208 and cloud 210, or may be contained within the positioning signals. By processing the times of arrival and using the known positions of the positioning cells, the location solver 204 calculates the position of the communication device 202 with respect to the positioning cells. The location solver sends data indicative of the calculated position to the communication device 202 or to the cloud 210.

In order for their positioning signals to be detected by the communication device 202, the positioning cells are configured for emitting positioning signals at times when the communication device's receiver is actively receiving signals from the cellular network. Furthermore, in order to determine the position of the communication device 202 at a high precision (e.g. 1-3 meters), the positioning cells 100a, 100b, 100c are synchronized tightly with each other.

Firstly, and optionally, the system 200 is to be coarsely or tightly synchronized with the cellular network. Second, a tight synchronization between the positioning cells is to be established. Third, an RF calibration of transmitters and receivers is to be performed.

Figure 5:
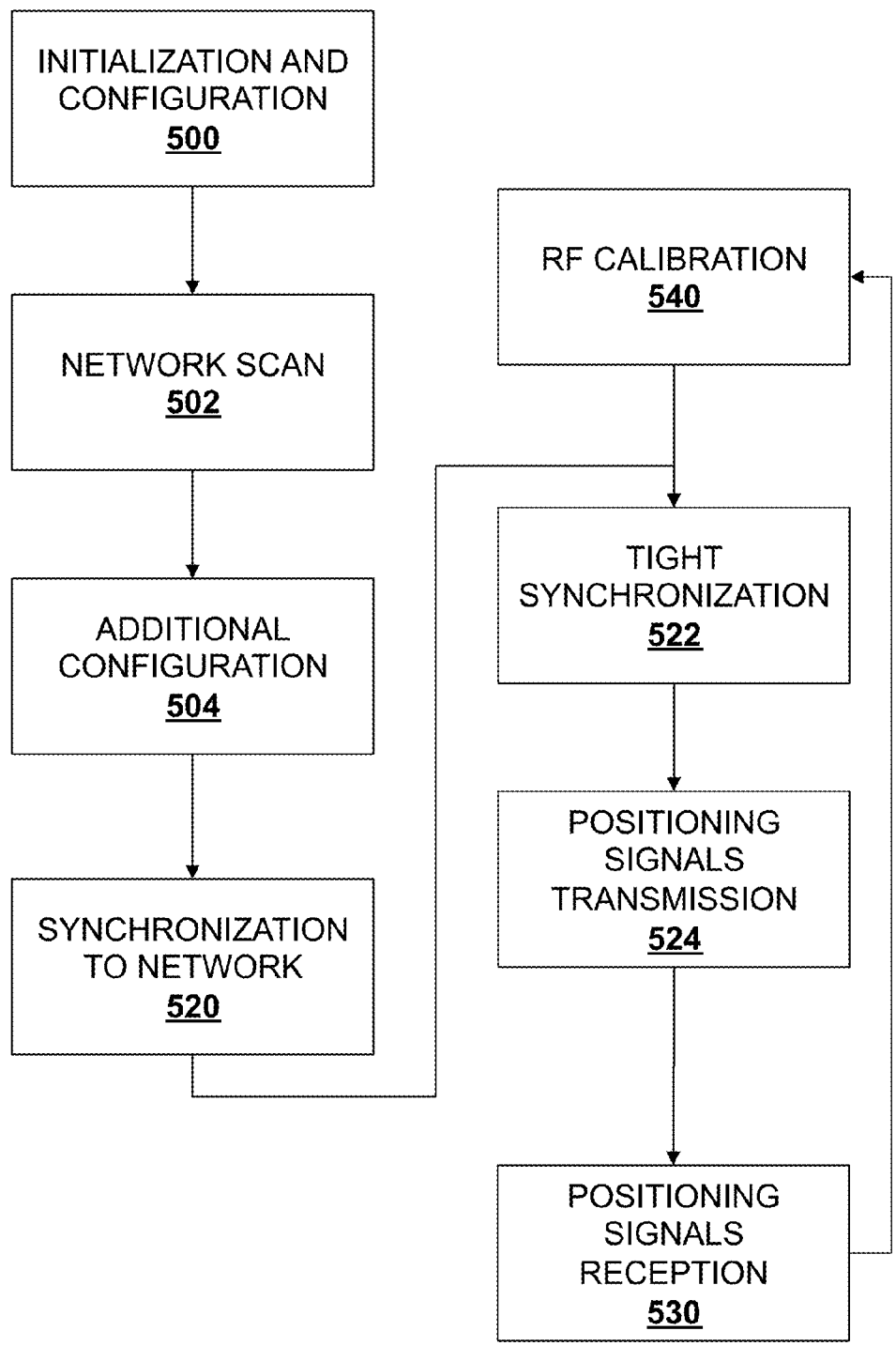
FIG. 5 is a flow diagram illustrating the positioning cells' state machine, according to some embodiments of the present invention.

The tight synchronization is achieved via tight synchronization signals 332 transmitted by the positioning cells and received by other positioning cells, preferable in line-of-sight condition for best accuracy. The tight synchronization signals could be the positioning signals themselves, or they could be different signals, for example, shorter packets with lower-power. While transmitting tight synchronization signals, the positioning cells cannot listen to other tight synchronization signals if transmitted in the same frequency band (unless a costly hardware is implemented); hence, the positioning cells take turns in transmitting and listening to other tight synchronization signals. When a positioning cell receives the tight synchronization signal from another positioning cell, it determines the time of arrival of the signal and subtracts the expected time of flight of the signal.
Synchronization with the Cellular Network Initially, as shown in FIG. 5 steps 500, 502 and 504, a main master positioning cell and possibly more master and slave positioning cells are turned on and are assumed connected to AC power or are battery powered. For battery powered positioning cells, certain procedures are minimized, as explained in the following, in order to prolong battery life. For initial programming and to receive network assistance info, the positioning cells may communicate with a nearby user configuration device 206 (e.g. phone or a master positioning cell) with proper credentials for network assistance data, e.g. via Bluetooth or WiFi connection, or via direct cellular connection between the master positioning cell and the network (in particular, the configuration server 208). The assistance data provides operator information, frequency bands and bandwidth to listen to, physical cell IDs (PCI) of neighboring macro cells, PCI of neighboring positioning cells if known, frame type, cyclic prefix type, number of antenna ports, etc. A goal of the assistance data is to greatly simplify the hardware in the positioning cell and enable low-cost software defined radios; and to enable optional battery-operated slave positioning cells that may last several months before having to recharge the battery; such positioning cells may alternatively be solar powered and include a battery.

Via the assistance data, the positioning cell tunes in to listen to the cellular network, function 502, e.g. LTE (4G). The positioning cell enters a monitor mode and listens to all bands and operators of the cellular system that are provided by the assistance data. In the case of LTE (4G), the positioning cell listens to the synchronization and acquisition signals (PSS/SSS) to find the frame synchronization and the physical cell ID (PCI) of the strongest macro cell(s) of the cellular network. The cellular network's signals may be analyzed without broadcast decoding or control decoding or data channel decoding. SSS decoding may be unnecessary if assistance data informs the positioning cell of the neighboring PCIs. If a positioning cell is unable to receive signals from the cellular network, and more generally for a slave positioning cell, it may obtain the coarse synchronization and configuration information by listening to signals, information and network assistance data transmitted over licensed or unlicensed band, or via wire, by the configuration device, by the master positioning cell, or by an intermediate second slave positioning cell who obtained the information from the master positioning cell or from the configuration device.

The best operator, i.e. the operator having the nearest macro cell, may be determined by measuring the energy in each frequency band. Optionally, the Received Signal Strength Indicator (RSSI) in each band is measured. In some embodiments of the present invention, RSSI can be measured in the RF block without enabling the Base Band (BB) block of the transceiver. The strongest RSSI usually signals the best operator.

The positioning cell determines precisely and efficiently its frequency error by listening to the strongest macro cell(s) on the network from any or all operator(s) via its cell-specific reference signal (CRS) pilots or other signals. Since the positioning cell is fixed and not expected to have any Doppler (from movement), therefore listening to the strongest cell(s) from any or all operator(s) can provide accurate frequency error estimation at low processing cost, the signals being generally of good quality. The positioning cell may further average the frequency error estimates from several macro cells, or use a weighted averaging where the weight for each macro cell is a function of the received SNR from each macro cell. Alternatively, in order to save power, the positioning cell may choose to estimate the frequency error using the signals of the strongest macro cell only (from all network operators). This procedure may be used during initialization and tracking of the frequency error.

The positioning cell determines timing synchronization, 520, based on strongest cell(s) PSS (any network operator), which automatically provides the timing for the remaining networks if they are synchronized (and given fixed time offsets between operators and bands, which are provided via assistance info). For decoding the PSS of a strong cell, the correlation may be limited to 1 or few bits (i.e. adders only) to avoid the use of multipliers. Hence, a 1 or few bit quantized PSS reference sequence may be used in the receiver and correlated to 1 or few bit quantized received signal from the strong or strongest macro cell. Power consumption is reduced as such. The timing of other macro cells belonging to the same frequency band, to a different frequency band, or to a different network operator, may be deduced from the timing of the strong macro cell. The timing is deduced by adding a timing offset that the configuration server provides to the positioning cell. In order to provide the timing offset information, the configuration server must first obtain the timing offset information, for example, from measurements performed by other positioning cells, by communication devices, by small cells, or directly from the database of the network operator, etc. For instance, if a positioning cell or a communication device whose position is known, and whose distance to two macro cells is known, listens to at least two macro cells from two different network operators, it can determine the time offset between their PSS signals up to 5 ms repetition period. It reports the measurements to the configuration server, along with the macro cells identities, the frequency bands and network operators each belongs to. The configuration server subtracts from the measurements the approximate time of flights from each macro cell to the positioning cell (note that accurate time offset is not needed since this procedure is part of the coarse synchronization procedure). The configuration server thus obtains one measurement of the timing offset between the PSS signals of two different network operators (or two different frequency bands). The timing offset is further averaged over many measurements from many positioning cells or communication devices in order to reduce the measurement noise. Furthermore, if the location of the macro cells is unknown to the configuration device, the averaging can reduce the error due to the unknown distances between the positioning cell or the communication device and the macro cells. The configuration server can thus create an internal database of PSS timing offsets between each frequency band, and between each network operator. The database will be local to each area, e.g. one city, or section of a city, or one stretch of a road. The configuration server can then provide this information to another positioning cell in order to guess the timing offset of some frequency band with respect to another frequency band that the positioning cell has listened to. As such, the positioning cell can listen to the strongest available macro cell and determine the timing of all other macro cells.

More precise timing may be obtained from the CRS pilots of the strong cell and can complement the information obtained from the PSS signal. Likewise, the CRS reference signal of a strong cell can be quantized to a few bits, and the received CRS signals from a macro cell may also be quantized to a few bits (before and/or after a Fast Fourier Transform, FFT).

Optionally, for the few strongest cells (any operators), the positioning cell measures and provides differential time of arrival measurements (via CRS pilot). The information can be sent to the configuration device 206 and then to a cloud service 210 for further processing. The cloud service 210 is connected to the configuration server and to the positioning cells via the configuration device. The cloud service 210 acts as a central control unit for a network, and is configured for processing data and requests, managing databases, and coordinating operations of the positioning units. The cloud service 210 may include one or more processing units and/or memory units, which may be located at a central location or may be distributed over a plurality of locations. The cloud service 210 may communicate with the processing units and memory units that are associated with the positioning cells and/or with the configuration server, in order to perform some of its operations. Connections to the cloud service 210 may be wired or wireless, and may be achieved via any kind of network, such as the internet and/or the cellular network. By knowing the (approximate) position of the positioning cell, the cloud service 210 can determine the approximate distance between the positioning cell and the measured macro cells of the cellular network. The information can be used to advance the transmission of the positioning cell so that it better aligns with the macro cell's symbols at the transmitter side, although this is sometimes not desired and the timing of the positioning cells can be set relative to the time of arrival at the receiver side of the nearest and strongest cell (per frequency band), possibly with some timing delay to account for other receptions from other farther macro cells. Alternatively, the configuration device 206 may inform the positioning cell 100 of the desired timing advance for a given cell of the cellular network, since the configuration device 206 has access to this information via its cellular network connection, or via a known approximate distance to a cell site, assuming it is connected to the strongest cell. The information may be used for timing advance or timing alignment in the positioning cell 100, as required per some predefined protocol, such that positioning signals transmitted by the positioning cell are time aligned with the positioning signals from the macro cells. This procedure is not necessary if the communication device does not use the macro cell's positioning signals, in addition to the positioning cells' positioning signals, for its localization operation.

When used with 4G/LTE cellular network, the positioning cell 100 obtains the 5 ms half-frame boundary from the PSS signal. It may decode one SSS of a strong cell in order to obtain the 10 ms boundary, and whose identity and scrambling code is provided by the configuration device 206. Or it may guess the 10 ms boundary by trying two hypotheses of CRS pilots (those of subframe 0 pilots, for example, tried every 5 ms), and whose identity and scrambling code is provided by the configuration device 206. The CRS hypothesis that exhibits stronger energy in the measured impulse response leads to the 10 ms boundary. The advantage over using SSS could be the wider bandwidth enabling quicker detection of the signals.

Next, the positioning cell 100 is configured for determining the System Frame Number (SFN), which is usually found by decoding the physical broadcast channel PBCH. But this is a relatively costly operation. Thus, two variants are provided for replacing the decoding of the PBCH.

In a first variant, the positioning cell 100 decodes only the strongest cell PBCH without Viterbi decoding or using a low-cost decoding of convolutional codes (e.g. Fano decoder). There is sufficient repetition and interleaving, the number of antennas is known, certain bits can be known, using a low-cost channel estimation, and if the average SNR post accumulation reaches 10 dB, which is typical for a strong cell, then the PBCH can be decoded at relatively low cost.

In a second variant, without decoding the PBCH, the configuration device 206 provides the SFN number, which it knows. For this to occur, the configuration device 206 needs to connect to the positioning cell 100 with the 10 ms time resolution. A protocol like Bluetooth between the positioning cell 100 and the configuration device 206 should offer such an option with time stamps at the hardware or firmware level so when a packet is decoded by upper layers, the time instant at which it was transmitted can be determined. This time instant is used by the positioning cell 100 to determine what the SFN was at that point.

Similarly to the PRS signals, the positioning cells and communication devices could report to the configuration server the timing offsets between the SFN number of macro cells of different frequency bands or different network operators. The configuration server can create and maintain a database of timing offsets between the SFN numbers. It can then inform another positioning cell of the timing offset between SFN numbers of various macro cells. The SFN number is mainly used in order to enable the positioning cell to obtain information on the super frame structure or the universal timing in a given frequency band, which enables it to know when to transmit positioning signals coarsely or tightly synchronized with the cellular network or with some wireless network. The configuration server can, for example, inform the positioning cell, especially the master positioning cell, that it may transmit the positioning signal at time T when SFN number of a first macro cell will be equal to T1 or equivalently when SFN number of a second macro cell will be equal to T2. The SFN provides a 10 ms boundary. The fraction of timing within the 10 ms boundary is provided by the PSS timing offset. Since the (master) positioning cell has decoded at least on SFN and at least one PSS from a strong cell, it can then guess the SFN number and PSS timing of a second macro cell, given the information provided by the configuration server. If it is instructed to transmit positioning signals in the frequency band of the second macro cell at a given coarse or fine timing, it knows how to find that timing.

Positioning reference signal (PRS) configuration and a virtual PCI with its own configuration are provided by the configuration server to the positioning cell 100. The positioning cell 100 can then start transmitting PRS pilots (positioning signals), initially without tight synchronization but with coarse synchronization at known times, to prevent interference with the cellular network.

Note that the configuration server may be decentralized, local to the venue, and takes its own decision on allocating the PCIs and positioning signals to the positioning cells. However, it would need to coordinate with a centralized configuration server that ensures all venues are making proper decisions and avoiding inter-venue interference.

In some embodiments of the present invention, if a positioning cell reboots, the whole procedure is restarted for that cell using a connection to the configuration device 206. The configuration device 206 may detect at some point the missing PRS pilot transmission by the positioning cell and triggers a request to reinitiate the procedure. The procedure may also be used after battery change or recharge, or if the macro cells of the cellular network reboot or change configuration. However, the parameters and decisions may be stored in some memory unit inside the positioning cell and reused after reboot to reduce the initial procedure length.

If PRS configuration of any operator in the cellular network changes, the PRS information in the positioning cells has to be updated, via licensed or unlicensed band messages, and via the configuration device.

Positioning cells 100, 100a, 100b, 100c may improve emergency responses by providing more accurate position. Moreover, they can be kept totally orthogonal (code/time/frequency orthogonal) to the other PRS from the cells of the cellular network, as will be explained below. Or, if the operators share the PRS burden, they can mute more macro cells in some PRS slots and let the positioning cells only transmit during those macro-muted times.

Once all positioning cells are configured and coarsely synchronized, e.g. via messages from the configuration server and configuration device, and a graph or tree of how the transmission order should be performed (FIGS. 4B, 4C, 4E), the tight synchronization procedure 522 can start followed by the positioning signals transmission 524. As shown in step 530, the positioning cells may then receive other tight synchronization signals or positioning signals from other positioning cells and perform the calibration procedure 540, which improves tight synchronization 522.

Design of Positioning Signals Emitted by the Positioning Cells

Optionally, in order to prevent confusion of the PCIs assigned to the positioning cells with PCI of macro cells belonging to the cellular network, a set of PCIs could be reserved for each positioning cell. Or a virtual PCI could be selected which can be a recycled PCI of a given macro cell; in order to prevent collision or confusion between the positioning signals of the macro cell and the positioning signals of the positioning cell, the latter could transmit its positioning signal with some circular time offset, if transmitting simultaneously; the circular time shift can be performed by using a phase ramp in frequency domain, or via cyclic shift per symbol in time domain. If a macro cell is no more than 5 km from the positioning cell, and with a channel of no more than 4 km, then the PCI of the macro cell can be recycled with a cyclic shift of 10 km, for example. If distances and channels are less than the above non-limiting exemplary values, several positioning cells could use different shifts, provided channel impulse responses do not collide. Each channel from a given positioning cell to a communication device 202 occupies a certain amount of time within an OFDM symbol. After the last hearable echoes are received by a channel in the communication device 202, any remaining echoes are too weak to make any noticeable difference in the received signal. The total duration of a channel is, for example, 10 microseconds. If the OFDM symbol is 70 microseconds, for example, then we can fit 7 channels where each is cyclic shifted in time domain to occupy 10 out of 70 microseconds.

Optionally, in order to further increase orthogonality between signals of the cellular network emitted by the macro cells 220 and signals emitted by the positioning cells 100a, 100b, 100c, a time domain cover code can be added to each positioning cell. So time domain (OFDM) symbols are, for example, multiplied by +1 or −1 in order to render them orthogonal after averaging nearby symbols, provided the device is not moving excessively fast. This is a correct assumption for the present system, which is configured for locating a communication device 202 travelling in a small environment at very low speed. By using both (cyclic) time shifts and orthogonal time cover codes (for a given fixed scrambling code, i.e. fixed recycled PCI), the space of PCIs can be substantially increased to allow for many more virtual PCIs that can be assigned to positioning cells. Such positioning cells emit signals that do not interfere with the cellular network in the vicinity of the venue. Some of the virtual PCIs could be used for antenna diversity, i.e. for transmission from a second antenna port having its own virtual PCI. Hence, additional virtual PCI can be created with cyclic time shifts; each cell, or each antenna occupies a different cyclic time shift. Note that there are 8 OFDM symbols within 1 ms PRS opportunity, in the case of LTE. This can provide for an 8-bit Hadamard codeword, i.e. 8 positioning cells with orthogonal positioning signals, using the same recycled PCI.

Optionally, the time slot reserved for the indoor and venue positioning cells is entirely void of any macro cell transmissions, and therefore the positioning signals can be designed specifically for the short-range case, independently of the macro cells, enabling a large amount of positioning cells to co-exist within 1 ms or so.

Virtual PCI may require a standard change or they can be part of a proprietary solution and offering.

With regard to a choice of operator or a plurality of operators in the cellular network, it should be noted that each positioning cell 100 needs a virtual PCI per operator and per frequency band that they use. In order to save RF resources, a positioning cell may transmit on one (or a few bands) at a time. In the event that a positioning cell needs to transmit a positioning signal (PRS pilot) on two bands or more (e.g. belonging to two operators or more) at the same time, the positioning cell may alternate between the two (or more) bands, transmitting every alternate time on one of them. This is a PRS muting mechanism, in which a positioning cell is supposed to transmit every X seconds but instead it transmits every 2X seconds, for example. Every other transmission is muted. Optionally, the cloud service 210 is informed of the muting pattern, and it informs the user device.

In some embodiments of the present invention, adjacent multi-bands and/or multi-operator positioning signals can be concatenated into one band when feasible, transmitted simultaneously or nearly simultaneously (e.g. a few milliseconds apart), which effectively results in a wider band. Optionally, the positioning cell ensures same phase/amplitude and well-known timing for each band transmission. In this embodiment, a communication device 202 with wide band capabilities (e.g. carrier aggregation) may combine in phase positioning signals received less than a few milliseconds apart from multiple bands/operators to obtain a more precise determination of its position. This is possible if the channel of the communication device 202 did not change much between the two inter-band transmissions. For example, for a walking person, the time between two band transmissions (to be concatenated) should be less than 10 ms. If the channel of the communication device 202 has changed substantially between the measured otherwise, received positioning signals from multiple bands/operators may be combined in power rather than in phase.

In some embodiments of the present invention, a positioning cell is configured to transmit on a unique band from a first operator, while communication devices 202 associated with other second operators know what band the positioning cell transmits on and are able to tune to such band for determining their own positions. In this case, we save bandwidth for the second operators. Or the first operator providing the service may charge an extra fee to the users (and corresponding applications) associated with the second operators. This is particularly useful if a second operator does not have a synchronized network and may rely on the first operator to provide the indoor positioning service. In a related embodiment, for example, rather than transmitting PRS every 200 ms, an operator can choose to transmit PRS every 600 ms. Two other operators can also choose to send PRS every 600 ms, interspersed or interleaved preferably at constant intervals. A communication device 202 listening to a certain operator, can then use regular gaps to listen to the PRS of a different operator. Thus, for a slow-moving communication device 202, this solution provides more sites with better geometry to perform position location. In other words, instead of each operator bearing the full cost of PRS transmission (i.e. reserving bandwidth for PRS), in order to permit acceptable mobile positioning based on its own network alone, the burden or cost can be split between two or more operators. Each operator transmits fewer instances of PRS pilots (e.g. every 2X or every 3X seconds, instead of every X seconds). Then when the operator is muting its own transmissions, another operator performs its own transmissions (again at a rate of every 2X or 3X seconds). The transmissions from 2 or more operators can be either interleaved about equally in time (which ensures best performance for a fast-moving device) or positioned very near in time (with longer silence periods) such that a device wakes up and listens to all operators in one shot, quickly one after the other, performs the positioning operation and returns to sleep. Optionally, battery life of the device is favored at the expense of speed (since transmissions are not interleaved equally in time domain but are emitted next to each other with long empty periods).

The above scheme enables saving PRS slots and reserving them for the positioning cells within various venues.

Positioning cells controlled by the cellular network (e.g., using licensed spectrum) may transmit/emit positioning signals (PRS pilots) in unlicensed spectrum. There is a good incentive for using the unlicensed spectrum, as the positioning signals emitted by the positioning cells are completely transparent and invisible to operators of the cellular network. Therefore, interference between the cellular network and positioning system is eliminated. However, the unlicensed band does not guarantee the same quality of service and accuracy under any scenario and in any environment, due to unmanageable interference.

If there is no listen-before-talk (LBT) constraint, the configuration of the positioning cells is performed as described above for the licensed spectrum. The communication device 202 may use its WiFi, BlueTooth, or other module to listen to the positioning signals. They may have a similar (or identical) structure to those used in the cellular licensed band. The cloud service 210 informs the communication device 202 that the band is an unlicensed band with given center frequency and bandwidth. Bandwidth in the unlicensed spectrum may be far wider and different PRS pilots can be designed.

In some embodiments of the present invention, given the short distances and indoor channels, the positioning cells may emit positioning signals designed for either licensed or unlicensed spectrum to take into account the shorter distance and indoor channels. In particular, symbol and FFT size could be much shorter to reduce power consumption or memory requirement. The symbols may still be overlaid onto the PRS region of the cellular network, and they can be orthogonal to the PRS signals of the cellular network, but the user device can be informed that these are shorter symbols.

WiFi Synchronization Between Positioning Cells

Up to now, the description was mainly aimed at systems and methods for positioning a communication device 202 via emission of positioning signals in the cellular frequency or in frequencies in which positioning cells act similarly to cellular cells and are designed to this end.

This section relates to a system of positioning cells which reuse already deployed or to be deployed WiFi stations or access points (APs). The techniques described below necessitate only software upgrades in the communications device and WiFi stations; some options involving hardware changes to the communication device 202 and/or WiFi stations will also be described. With the upgrade, a WiFi AP can act like a positioning cell.

It should be noted that in general WiFi stations are limited by a Listen-Before-Talk (LBT) constraint, in which each station first senses its radio environment before it starts a transmission.

Normally each AP transmits a WiFi beacon every 102.4 ms, that can span 20 MHz. This band is not broad enough to enable reliable positioning within 1 meter. However, data transmission bandwidth in APs can go up to 80 or 160 MHz in 802.11ac, which is sufficient for a 1-meter precision.

Today 802.11ac precision location works by measuring round trip delays between the communication device 202 (e.g. mobile phone) and each AP. This technique includes transmitting packets and receiving packets to each AP (at least one packet in each direction, with wideband). This technique uses up the communication device's battery since the communication device 202 has to exchange communication with each AP in the vicinity, transmitting a packet and decoding a packet for each position measurement. If the communication device 202 moves by a few meters, the packet transmission has to start again to and from each AP, assuming a 1 m desired precision. Furthermore, the technique is not scalable when the number of communication devices in the venue grows, as it uses substantial bandwidth for exchanging messages.

In order to reduce power consumption and message exchanges, the inventor has adopted a technique similar to that of a synchronized network describe above. The APs listen to each other's positioning beacons (positioning signals) and they synchronize to each other as described earlier in this application in the tight synchronization procedure. In an embodiment, the APs are located at elevated positions and are in LOS with each other, which enables improved tight synchronization.

Once tightly synchronized, the normal beacons from the APs will appear at some predetermined time, every 102.4 ms, without drift or with minimal drift that is regularly corrected. Nevertheless, due to carrier sensing in unlicensed spectrum, beacons can slightly shift while waiting for another transmission to finish.

In an embodiment, the APs are configured for emitting p-beacons (positioning beacons or positioning signals, and that also act as tight synchronization signals). Each AP transmits a p-beacon at a desired period, e.g. every 1 s, 5 s or 10. The venue in which the APs are located determines the period. In some venues, the network is not so loaded, so emission of p-beacons every 1 s or less is possible and scalable without impacting the network capacity. Optionally, all p-beacons are transmitted at predetermined and adjacent timings within their transmission period, which enables the communication device 202 to quickly listen to all p-beacons, transmitted in a quick succession, and thus to save battery. A normal beacon may include data which indicates where the position of all the p-beacons is, relative to the normal beacon. In this manner, the communication device 202 does not have to search for the p-beacons. Alternatively, the APs are synchronized to the cellular network (or to satnav) and the communication device 202 is informed by the configuration server and cloud where to locate the p-beacons without decoding any normal beacon. Positioning p-beacons can be orthogonal waveforms, in time and/or frequency (orthogonal cover code over OFDM symbols, or one beacon per few OFDM symbols, and orthogonal cyclically shifted beacons over OFDM symbols). P-beacons include pilots for measuring the time of flight.

In the simplest scheme, each AP will transmit several OFDM symbols containing mainly pilots, followed by next AP, and so on. A small gap could be used between transmissions. A typical or special preamble may precede the OFDM symbols. This makes for minimal or no changes to hardware/firmware.

Rather than transmitting OFDM symbols, p-beacons may include preambles only.

The configuration server reserves a time for the p-beacons that is suitable for the venue(s) based on customer requirements. This time is synchronized with the cellular network or other network. Since the cellular networks SFN period is 10.24 seconds, therefore, this time will also be synchronized with the 102.4 ms normal WiFi beacon, and hence the normal beacon and the p-beacon will not appear to drift with respect to each other. A repetition period can be of the order of 1 s or 5 s or 10 s, for example. The cellular network may inform the communication device of the location of the p-beacons throughout an area or a city. Hence, a communication device can quickly locate it without any search.

The p-beacon, unlike the normal beacon, spans a wideband (e.g. 80 or 160 MHz) and does not need to be a normal packet. The p-beacon is optionally set as a very short burst and may contain only the fields sufficient to calculate a channel estimate, i.e. time of arrival (preamble, optionally dummy but known data, optionally orthogonal frequency-division multiplexing (OFDM) pilots without data, etc.). The communication device 202 estimates a channel without necessarily performing any data decoding.

In principle, if the transmission of the p-beacons is synchronous, and with known transmission timing for each p-beacon, precise time difference of arrival (TDOA) multi-lateration can be performed to locate the communication device 202. However, due to the need of carrier sensing in unlicensed spectrum, the p-beacons may have to be delayed until another transmission terminates and may therefore be shifted in time. A time shift breaks the synchronicity property, and the transmission timing is no longer known.

In order to solve this problem of time shift, when an AP must delay its transmission due to another ongoing transmission, it is configured to time shift the p-beacon by an amount that is a multiple of a fixed and known unit of time (or unit of distance) with respect to the original transmission timing that was missed. For example, the delay is a multiple of 200 meters, i.e. 600 ns, or a multiple of 1000 m, i.e. 3 us. The unit of time must be longer than the longest expected time of flight between an AP and a communication device, or between an AP and another AP that may be listening. By shifting the p-beacon by multiples of 200 m, i.e. 600 ns, the communication device 202 can determine that there was a shift (since it is longer than any realistic channel), and that it needs to subtract a multiple of 200 m from the measured time of arrival, i.e. a modulo 200 m operation (otherwise the time of arrival appears too late to be valid; subtracting a multiple of 200 m fixes the problem). Therefore, without knowing the precise transmission timing in case of delayed transmission, the communication device 202 can still figure it out by using a modulo 200 m operation. Regular TDOA multilateration can thus be used as if the transmissions were synchronized, despite an AP having to delay its transmission.

Alternatively, in order to prevent yet another transmission from another device during the 600 ns wait, the AP may reserve the medium by starting the transmission of dummy bits (distinguishable from the p-beacon signal) until the p-beacon can start at the 600 ns boundary. In essence, the AP reserves the medium via dummy bits while waiting for the ideal starting time of the p-beacon. This method enables some already deployed APs to provide accurate positioning via software upgrade.

Furthermore, the first AP to transmit a p-beacon may act like a master positioning cell. The second AP to transmit a p-beacon, quickly after, resynchronizes itself to the first p-beacon before it transmits its second p-beacon. And so on, each AP resynchronizes itself to the preceding p-beacons before transmitting its own p-beacon. This ensures the transmission of p-beacons is tightly synchronized to the first master AP. It is therefore useful to create an order of transmission such that each AP gets a chance to hear either the master AP or another AP that transmitted earlier. The preferred order is such that the next AP to transmit is in LoS with respect to an AP that has previously transmitted. And so on until all APs are covered in a tree-like fashion. Furthermore, some gap between transmissions is needed to allow for the communication device to decode each p-beacon, but also for the APs to decode preceding p-beacons, adjust their timing and start transmitting their own p-beacon. Finally, RF calibration can be achieved by having the even numbered APs listen to the odd numbered APs, and vice versa (as shown in FIG. 4B), and at least one even numbered AP listen to one odd numbered AP, or vice versa. The RF calibration procedure is detailed above.

The master AP may further synchronize coarsely to the cellular network, which enables a communication device 202 to quickly locate all p-beacons without any search, and without decoding any normal beacon. A hardware upgrade is usually needed for the master AP in order to be able to listen to the cellular network. Alternatively, a software upgrade is made to the communication device 202, to assist the master and all APs in synchronizing to the cellular network. When the communication device 202 enters the venue (or is at a certain distance from any one of the APs), an AP synchronizes its p-beacon to the communication's device clock, which is already synched to the cellular network. The rest of the APs will correct their timing as needed via WiFi messages, for example, informing them of the delta in timing to apply. It is only the p-beacon that needs to be readjusted in time in order to re-align it with the cellular network, while the normal beacon can remain at any position in time. After several hours, the p-beacons only shift by 1 ms or so, which is still a short time for a communication device 202 to search for the p-beacons. When a second communication device 202 enters the range of the APs, the communication device 202 can first look for the p-beacon at known positions with respect to the cellular network, without searching for the WiFi normal beacons, nor decoding WiFi normal beacons. This achieves better continuity between LTE-OTDOA and WiFi as the communication device 202 moves from outdoor (cellular network) to indoor (AP network), with further reduced power consumption. The info about APs and p-beacons can be obtained from the network over 4G or WiFi (assisted info). If the second communication device cannot detect the p-beacons, it then informs the WiFi APs that they may need to readjust the timing of the p-beacons, and it provides the timing, which is knows from the cellular network.

Synchronization to Satellite Navigation Systems

In a further embodiment, the systems, methods and devices described herein may be applied based upon the use of satellite navigation systems ("satnav") such as the United States Global Positioning System (GPS), European Union Galileo or Russia's Globalnaya Navigazionnaya Sputnikovaya Sistema (GLONASS) technology. This is especially useful if at least the master positioning cell is located outdoor and if the system does not use the licensed band but only uses the unlicensed band for the positioning signals (e.g. using WiFi signals as positioning signals within the venue).

In an embodiment, the master positioning cell may be configured to receive the navigation messages transmitted from a plurality of satellites. One skilled in the art would appreciate that the decoding and combining of messages from multiple satellites may be used to determine both the position of the master positioning cell as well as establish a precise time reference.

In an embodiment, the master positioning cell may use the satnav based time reference to determine the timing of a tight synchronization signal. As described herein, the tight synchronization signal may be constructed in the form of a 3GPP (e.g. LTE) PRS pilot.

The master positioning cell may transmit the tight synchronization signal to be received by one or more secondary master positioning cells or slave positioning cells using a 3GPP receiver. The receiving positioning cells may apply one or more of the timing and positioning methods described herein to establish one or more times of arrival and to synchronize the transmission of a further positioning signal.

In an embodiment, the system or configuration server determines a convenient universal time T and repetition period P that the master positioning cells may use to initiate the transmission of the positioning signals and the tight synchronization signals (e.g. in unlicensed band). In this case, the master positioning cell may obtain the universal time either by listening to the satnav signals or, if it cannot hear the satnav signals, by listening to a strong macro cell from the cellular network and applying a predetermined time offset to locate the universal time T; this assumes that the macro cell is itself synchronized to the satnav signals and that the configuration server can learn the time offset between the macro cell signals (especially the Super Frame Number and 10 ms boundary) and the preselected universal time T, and informs the master positioning cell of the time offset. Furthermore, to prevent drifts between the satnav signals, the cellular network signals, and potentially the WiFi beacon signals, the repetition period P may be chosen as a multiple of 102.4 ms or multiple of 512 ms.

Asynchronous Option

In an embodiment, the positioning cells in a venue are tightly synchronized and calibrated between each other but are not synchronized to an external system such as a cellular network or satnav signals. In this case, the timing of the positioning cells will drift over time with respect to the external systems. When a communication device enters a venue, it will have to search for the positioning signals since they drift over time.

In an embodiment, the usual beacons of the WiFi Access Points, transmitted every 102.4 ms can provide information regarding the timing and periodicity of the positioning signals within the venue. Therefore, the communication device can find the signals by listening to a usual beacon without having to search for many seconds for the positioning signals.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method implemented by a positioning cell for supporting positioning determination of a communication device in a wireless communication network, the method comprising:
   receiving by the positioning cell from a master positioning cell a plurality of tight synchronization signals;
   determining by the positioning cell a plurality of time differences between times of arrival of the plurality of tight synchronization signals and theoretical times of arrival of the plurality of tight synchronization signals, where the theoretical times of arrival are corrected by theoretical times of flight along a direct line-of-sight path from the master positioning cell to the positioning cell;
   synchronizing the positioning cell based on one or more of the received tight synchronization signals adjusted by one or more of the plurality of time differences, wherein the synchronizing comprises synchronizing a clock in the positioning cell;
   emitting by the positioning cell to the communication device in the wireless communication network a positioning signal at a time determined by the synchronized clock; wherein the positioning signal comprises data indicative of an identifier of the positioning cell; wherein the positioning signal is transmitted so as not to interfere with positioning pilot signals transmitted by the wireless communication network.

2. The method of claim 1 wherein the plurality of tight synchronization signals received from the master positioning cell are synchronized by the master positioning cell to synchronization signals from another master positioning cell, cellular network, WiFi network, or satnav system.

3. The method of claim 1 wherein the data indicative of an identifier of the positioning cell comprises local physical cell identifications (PCIs) and no global cell identifications.

4. The method of claim 1 wherein the emitting of the positioning signal uses multiplexing so that the positioning signal is orthogonal to pilot signals transmitted by the wireless network.

5. The method of claim 1 further comprising receiving by the positioning cell from the master positioning cell data indicative of time differences between a measured time of arrival of the positioning signal at the master positioning cell and a theoretical time of arrival of the positioning signal at the master positioning cell; and
   determining by the positioning cell from the data indicative of time differences an adjustment in a timing of emission of a subsequent positioning signal from the positioning cell.

6. A method implemented by a positioning cell for supporting positioning determination of a communication device in a wireless communication network, the method comprising:
   receiving by the positioning cell from a first positioning cell a tight synchronization signal, wherein the tight synchronization signal is synchronized by the first positioning cell to tight synchronization signals received by the first positioning cell from a master positioning cell that is synchronized to a cellular network, WiFi network, or satnav system;
   emitting by the positioning cell to the communication device in the wireless communication network a positioning signal after a predetermined time period following reception of the tight synchronization signal; wherein the positioning signal comprises data or timing indicative of an identifier of the positioning cell.

7. The method of claim 6 wherein the positioning signal is transmitted so as not to interfere with positioning pilot signals transmitted by the wireless communication network.

* * * * *